United States Patent
Kim et al.

(10) Patent No.: US 12,379,807 B2
(45) Date of Patent: *Aug. 5, 2025

(54) INPUT SENSING DEVICE AND DISPLAY DEVICE INCLUDING THE SAME

(71) Applicant: SAMSUNG DISPLAY CO., LTD., Yongin-si (KR)

(72) Inventors: Ji Woong Kim, Yongin-si (KR); Moon Jae Jeong, Yongin-si (KR); Hyung Gun Ma, Yongin-si (KR); Tae Hun Lee, Yongin-si (KR); Keum Dong Jung, Yongin-si (KR); Sang Hyun Heo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,158

(22) Filed: Feb. 5, 2024

(65) Prior Publication Data
US 2024/0176450 A1    May 30, 2024

Related U.S. Application Data

(63) Continuation of application No. 18/176,440, filed on Feb. 28, 2023, now Pat. No. 11,893,186.

(30) Foreign Application Priority Data

Jun. 29, 2022    (KR) .................. 10-2022-0080033

(51) Int. Cl.
*G06F 3/041*     (2006.01)
*G06F 3/044*     (2006.01)

(52) U.S. Cl.
CPC ........ *G06F 3/04182* (2019.05); *G06F 3/0446* (2019.05); *G06F 3/0447* (2019.05)

(58) Field of Classification Search
CPC ... G06F 3/04182; G06F 3/0446; G06F 3/0447
See application file for complete search history.

(56) References Cited

U.S. PATENT DOCUMENTS

| | | |
|---|---|---|
| 8,031,094 B2 | 10/2011 | Hotelling |
| 9,030,340 B1 | 5/2015 | Waltari |
| 9,348,472 B2 | 5/2016 | Kang et al. |
| 10,120,498 B2 | 11/2018 | Gray |
| 10,969,917 B2 | 4/2021 | Krah et al. |

(Continued)

FOREIGN PATENT DOCUMENTS

KR    10-1681747    12/2016

*Primary Examiner* — Michael Pervan
(74) *Attorney, Agent, or Firm* — F. CHAU & ASSOCIATES, LLC

(57) ABSTRACT

An input sensing device includes first driving electrodes, second driving electrodes, and sensing electrodes, and a sensing driver that transmits a first driving signal to the first driving electrodes at a first frequency, transmits a second driving signal to the second driving electrodes at a second frequency, and determines a touch or approach of an external object based on sensing signals received from the sensing electrodes. The sensing driver includes analog front-end circuits that separate a sensing signal of the first frequency and a sensing signal of the second frequency that are received from the respective sensing electrodes, and generate digital sensing data based on a result of a recombination of the separated sensing signals.

24 Claims, 17 Drawing Sheets

(56) References Cited

U.S. PATENT DOCUMENTS

| | | |
|---|---|---|
| 11,402,945 B2 | 8/2022 | Han |
| 11,650,697 B1 | 5/2023 | Jeong |
| 2009/0189867 A1 | 7/2009 | Krah et al. |
| 2011/0063164 A1 | 3/2011 | Hotelling et al. |
| 2023/0117808 A1 | 4/2023 | Ma et al. |
| 2023/0152924 A1 | 5/2023 | Jeong |
| 2023/0259236 A1 | 8/2023 | Jeong |
| 2023/0280869 A1 | 9/2023 | Jeong |

STI: 161, 162

INPUT SENSING DEVICE AND DISPLAY DEVICE INCLUDING THE SAME

CROSS-REFERENCE TO RELATED APPLICATION

The present application is a continuation of U.S. patent application Ser. No. 18/176,440, filed on Feb. 28, 2023 in the U.S. Patent and Trademark Office, which claims priority under 35 U.S.C. § 119 from Korean patent application number 10-2022-0080033, filed on Jun. 29, 2022 in the Korean Intellectual Property Officer, the contents of which are herein incorporated by reference in their entirety.

TECHNICAL FIELD

Various embodiments of the present disclosure are directed to an input sensing device and a display device that includes the input sensing device.

DISCUSSION OF THE RELATED ART

Display devices typically include a display panel that can display an image, and a touch panel disposed on the display panel and that receives a touch input.
The touch panel includes a plurality of touch electrodes, and determines a touched point by sensing a variation in capacitance formed on the plurality of touch electrodes.

SUMMARY

Various embodiments of the present disclosure are directed to an input sensing device that separates frequencies of sensing signals and removes noise therefrom, and recombines the separated frequencies and generates sensing data.

Various embodiments of the present disclosure are directed to a display device that includes the input sensing device.

An embodiment of the present disclosure provides an input sensing device that includes: first driving electrodes, second driving electrodes, and sensing electrodes; and a sensing driver that transmits a first driving signal to the first driving electrodes at a first frequency, transmits a second driving signal to the second driving electrodes at a second frequency, and determines a touch or approach of an external object based on sensing signals received from the sensing electrodes. The sensing driver includes analog front-end circuits that separate a sensing signal of the first frequency and a sensing signal of the second frequency that are received from the respective sensing electrodes, and generate digital sensing data based on a result of a recombining the separated sensing signals.

In an embodiment, a frequency of the sensing signal that is received from each of the sensing electrodes varies in response to the first driving signal and the second driving signal.

Each of the analog front-end circuits may include: a charge amplification component that differentially amplifies a first sensing signal and a second sensing signal that are respectively received by a first input terminal and a second input terminal, and outputs a first differential signal and a second differential signal through a first output terminal and a second output terminal, respectively; a filter component that filters the first differential signal and outputs a first filtered signal and a second filtered signal in different frequency bands, and filters the second differential signal and outputs a third filtered signal and a fourth filtered signal in different frequency bands; and a buffer component that outputs a first combined differential signal and a second combined differential signal based on the first to fourth filtered signals.

In an embodiment, the frequency band of each of the first filtered signal and the third filtered signal includes the first frequency. The frequency band of each of the second filtered signal and the fourth filtered signal includes the second frequency.

In an embodiment, the buffer component includes: a first stage that generates a first input by combining the first filtered signal and the second filtered signal, and generates a second input by combining the third filtered signal and the fourth filtered signal; and a second stage that includes a differential difference amplifier (DDA) that outputs the first combined differential signal and the second combined differential signal based on the first input and the second input. The DDA includes a negative feedback loop.

In an embodiment, the first stage includes: a first combiner that includes transistors that combine the first filtered signal and the second filtered signal; and a second combiner that includes transistors that combine the third filtered signal and the fourth filtered signal. The DDA functions as a buffer.

In an embodiment, the filter component includes: a first band-pass filter that outputs the first filtered signal by filtering the first differential signal, and outputs the third filtered signal by filtering the second differential signal; and a second band-pass filter that outputs the second filtered signal by filtering the first differential signal, and outputs the fourth filtered signal by filtering the second differential signal.

In an embodiment, the first band-pass filter and the second band-pass filter are connected in parallel between the charge amplification component and the buffer component.

In an embodiment, each of the first band-pass filter and the second band-pass filter includes: a first mixer that down-converts a frequency of an input signal and outputs a modulated signal; a low-pass filter that outputs a low-frequency band signal from the modulated signal; and a second mixer that up-converts an output of the low-pass filter to an original frequency band and outputs a demodulated signal as an output of the filter component.

In an embodiment, the input sensing device further includes a third driving electrode to which a third driving signal is transmitted at a third frequency. The filter component includes a third band-pass filter that outputs a fifth filtered signal by filtering the first differential signal, and outputs a sixth filtered signal by filtering the second differential signal.

In an embodiment, the buffer component includes: a first combiner that combines the first filtered signal, the second filtered signal, and the fifth filtered signal and generates a first input; a second combiner that combines the third filtered signal, the fourth filtered signal, and the sixth filtered signal and generates a second input; and a differential difference amplifier (DDA) that outputs the first combined differential signal and the second combined differential signal based on the first input and the second input. The DDA includes a negative feedback loop.

In an embodiment, each of the analog front-end circuits includes: a common mode feedback circuit that includes a negative feedback loop that maintains an output of a common mode for the first sensing signal and the second sensing signal; and a mixer that converts a frequency of the output of the common mode feedback circuit.

In an embodiment, each of the analog front-end circuits further includes a distribution circuit disposed between the sensing electrodes and the charge amplification component. to the distribution circuit selects two of the sensing electrodes and provides sensing signals of the two selected sensing electrodes to the first input terminal and the second input terminal of the charge amplification component, respectively.

In an embodiment, the distribution circuit includes a multiplexer that selects the two sensing electrodes from the sensing electrodes.

In an embodiment, each of the analog front-end circuits further includes an analog-to-digital converter that outputs digital sensing data in response to the first combined differential signal and the second combined differential signal.

In an embodiment, the sensing driver further includes a sensing processor that Fourier transforms the digital sensing data into transformed data that includes a first frequency component that corresponds to the first frequency and the second frequency component that corresponds to the second frequency, and determines a touch location based on the transformed data.

An embodiment of the present disclosure provides a display device that includes: a display panel that includes pixels; first driving electrodes, second driving electrodes, and sensing electrodes disposed on the display panel; and a sensing driver that transmits a first driving signal to the first driving electrodes at a first frequency, transmits a second driving signal to the second driving electrodes at a second frequency, and determines a touch or approach of an external object based on sensing signals received from the sensing electrodes. The sensing driver includes analog front-end circuits that separate a sensing signal of the first frequency and a sensing signal of the second frequency that are received from the respective sensing electrodes, and generates digital sensing data based on a result of recombining the separated sensing signals. A frequency of the sensing signal that are received from each of the sensing electrodes may vary in response to the first driving signal and the second driving signal.

In an embodiment, each of the analog front-end circuits includes: a charge amplification component that differentially amplifies a first sensing signal and a second sensing signal that are respectively received by a first input terminal and a second input terminal, and outputs a first differential signal and a second differential signal through a first output terminal and a second output terminal, respectively; a filter component that filters the first differential signal and outputs a first filtered signal and a second filtered signal in different frequency bands, and filters the second differential signal and outputs a third filtered signal and a fourth filtered signal in different frequency bands; and a buffer component that outputs a first combined differential signal and a second combined differential signal based on the first to fourth filtered signals.

In an embodiment, the filter component includes: a first N-path filter that outputs the first filtered signal by filtering the first differential signal, and outputs the third filtered signal by filtering the second differential signal; and a second N-path filter that outputs the second filtered signal by filtering the first differential signal, and outputs the fourth filtered signal by filtering the second differential signal. The first N-path filter and the second N-path filter are connected in parallel between the charge amplification component and the buffer component.

In an embodiment, the buffer component includes: a first stage that generates a first input by combining the first filtered signal and the second filtered signal, and generates a second input by combining the third filtered signal and the fourth filtered signal; and a second stage that includes a differential difference amplifier (DDA) that outputs the first combined differential signal and the second combined differential signal based on the first input and the second input. The DDA includes a negative feedback loop.

An embodiment of the present disclosure provides an input sensing device that includes: a sensing driver that includes analog front-end circuits that separate sensing signals of different frequencies that are received from sensing electrodes, and generates digital sensing data based on a result of a recombination of the separated sensing signals. Each of the analog front-end circuits includes: a charge amplification component that differentially amplifies a first sensing signal and a second sensing signal that are respectively received by a first input terminal and a second input terminal, and outputs a first differential signal and a second differential signal through a first output terminal and a second output terminal, respectively; a filter component that filters the first differential signal and outputs a first filtered signal and a second filtered signal in different frequency bands, and filters the second differential signal and outputs a third filtered signal and a fourth filtered signal in different frequency bands; a buffer component that outputs a first combined differential signal and a second combined differential signal based on the first to fourth filtered signals; and an analog-to-digital converter that outputs digital sensing data in response to the first combined differential signal and the second combined differential signal.

In an embodiment, the input sensing device further includes first driving electrodes, second driving electrodes, and sensing electrodes. The sensing driver transmits a first driving signal to the first driving electrodes at a first frequency, transmits a second driving signal to the second driving electrodes at a second frequency, and determines a touch or approach of an external object based on sensing signals received from the sensing electrodes. A frequency of the sensing signal that is received from each of the sensing electrodes varies in response to the first driving signal and the second driving signal.

In an embodiment, the buffer component includes a first stage that generates a first input by combining the first filtered signal and the second filtered signal, and generates a second input by combining the third filtered signal and the fourth filtered signal; and a second stage that includes a differential difference amplifier (DDA) that outputs the first combined differential signal and the second combined differential signal based on the first input and the second input. The DDA includes a negative feedback loop.

In an embodiment, the filter component includes a first band-pass filter that outputs the first filtered signal by filtering the first differential signal, and outputs the third filtered signal by filtering the second differential signal; and a second band-pass filter that outputs the second filtered signal by filtering the first differential signal, and outputs the fourth filtered signal by filtering the second differential signal.

In an embodiment, the sensing driver further includes a sensing processor that Fourier transforms the digital sensing data into transformed data that includes a first frequency component that corresponds to the first frequency and a second frequency component that corresponds to the second frequency, and determines a touch location based on the transformed data.

DETAILED DESCRIPTION

Figure 1:
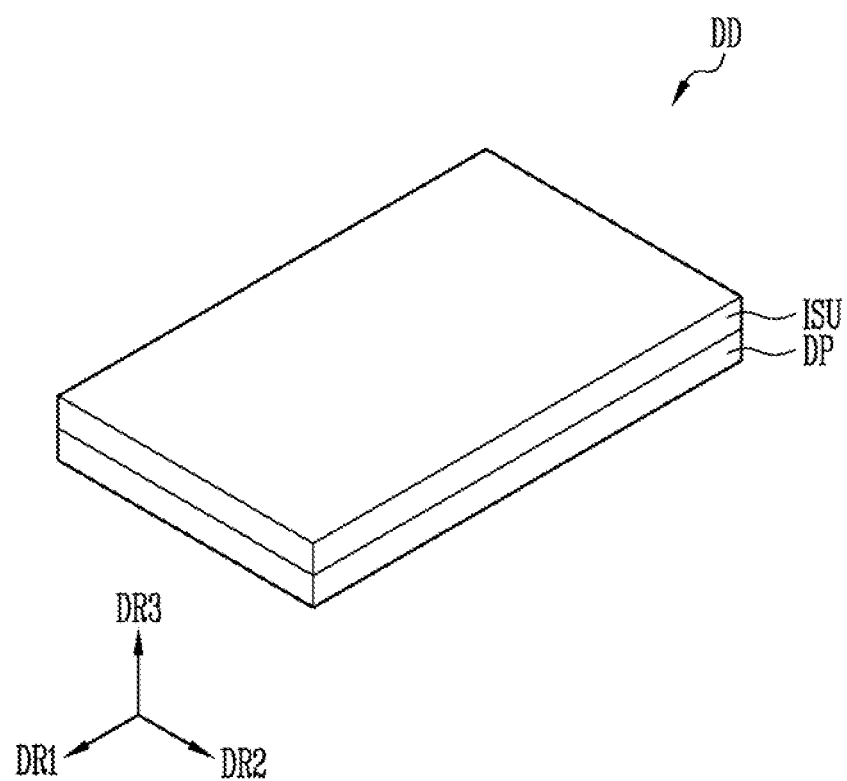
FIG. 1 is a perspective view of a display device in accordance with an embodiment of the present disclosure.

Various embodiments of the present disclosure will hereinafter be described in detail with reference to the accompanying drawings. The same reference numerals may be used throughout the different drawings to designate the same components, and repetitive description of the same components will be omitted.

FIG. 1 illustrates a display device DD in accordance with an embodiment of the present disclosure.

Referring to FIG. 1, in an embodiment, the display device DD may be provided in various forms, such as the form of a rectangular plate having two pairs of parallel sides.

The display device DD displays an image through a display surface. The display surface is parallel to a plane defined by a first direction DR1 and a second direction DR2 that crosses the first direction. A normal direction of the display surface, such as a thickness direction of the display device DD, is defined as a third direction DR3 that is normal to the plane defined by the first direction DR1 and the second direction DR2.

The display device DD includes a planar display surface. However, embodiments of the present disclosure are not necessarily limited thereto. For example, in some embodiments, the display device DD includes other types of display surfaces, such as a curved display surface or a three-dimensional display surface that can display an image.

In an embodiment, the display device DD is a flexible display device. For example, the display device DD may be incorporated into a foldable display device, a bendable display device, a rollable display device, a stretchable display device, etc. However, embodiment of the present disclosure are not necessarily limited thereto, and in an embodiment, the display device DD is a rigid display device.

The display device DD can be incorporated not only into large electronic devices such as a television, a monitor, or an electronic display board, but also into small and medium size electronic devices, such as a cellular phone, a tablet PC, a navigation device, a game console, or a smart watch, etc. Furthermore, the display device DD can also be incorporated into a wearable electronic device such as a head-mount display.

The display device DD includes a display panel DP and an input sensing unit ISU, or input sensing layer, input sensing panel, etc.

In an embodiment, the display panel DP and the input sensing unit ISU are formed through a successive process. However, embodiments of the display panel DP and the input sensing unit ISU are not necessarily limited thereto. For example, in an embodiment, the display panel DP and the input sensing unit ISU are coupled to each other by an adhesive component. The adhesive component includes a typical adhesive or a removable adhesive. For example, the adhesive component is an optical transparent adhesive component.

The input sensing unit ISU senses an external input on the display surface of the display device DD, such as a touch or an approach (e.g., hovering) of an external medium such as a hand or a pen.

The display panel DP is an emission type display panel. For example, the display panel DP includes at least one of an organic light emitting element, an inorganic light emitting element, or a quantum dot.

In an embodiment, the display device DD further includes an anti-reflection panel and a window panel.

The anti-reflection panel is disposed on the input sensing unit ISU, and reduces the reflectivity of external light that is incident on the display surface of the display device DD. For example, the anti-reflection panel includes color filters. The color filters have a predetermined arrangement. The arrangement of the color filters is determined by taking into account the colors of light to be emitted from of the pixels in the display panel DP.

The window panel is disposed on the input sensing unit ISU, and protects the display panel DP and the input sensing unit ISU from external factors, such as external impacts. The window panel includes at least one of a synthetic resin film or a glass substrate, etc. In an embodiment, window panel includes two or more films coupled to each other by an adhesive component.

Figure 2:
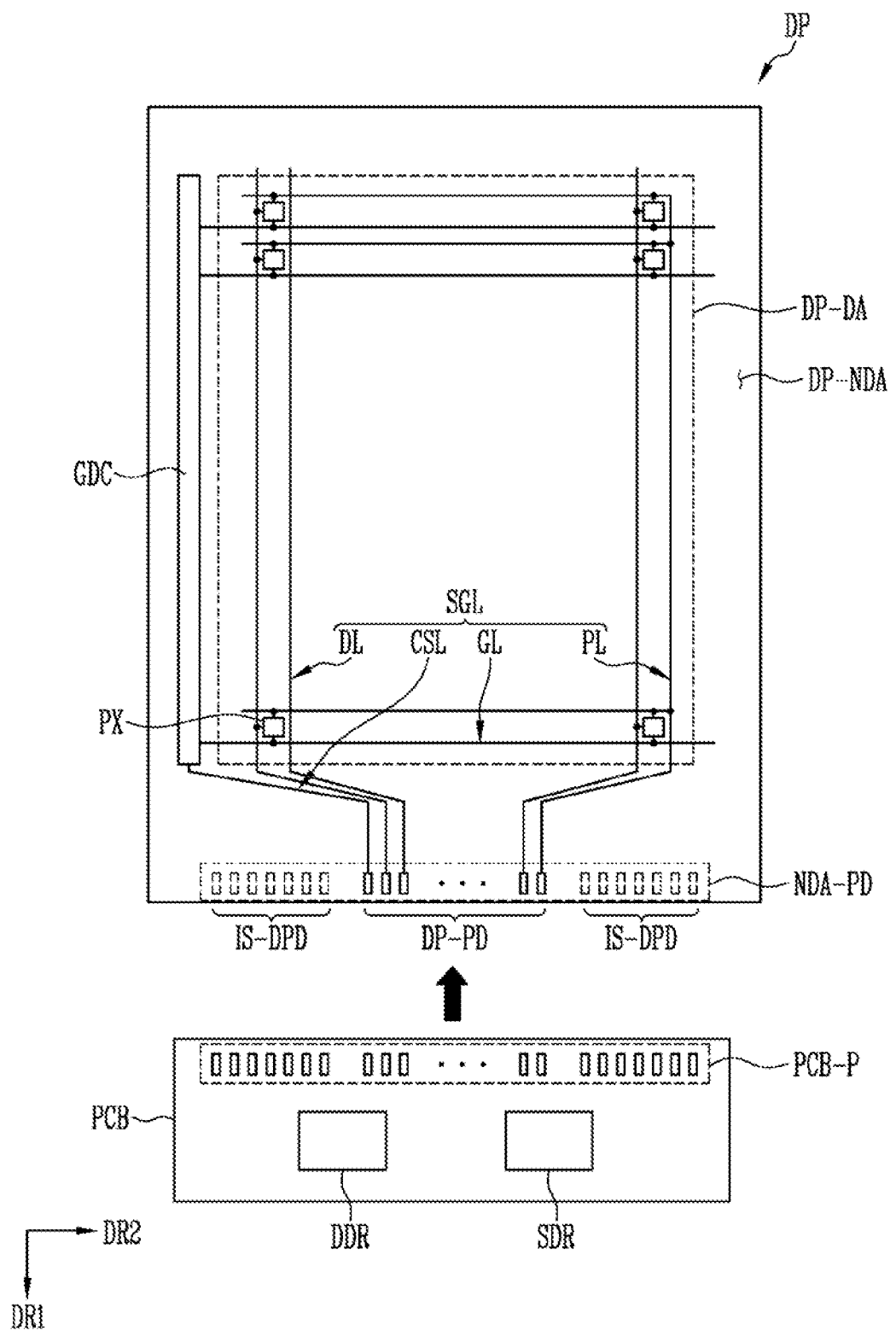
FIG. 2 illustrates a display panel in a display device of FIG. 1.

FIG. 2 illustrates a display panel DP in a display device DD of FIG. 1.

Referring to FIGS. 1 and 2, in an embodiment, the display panel DP includes a display area DP-DA in which an image is displayed, and includes a plurality of pixels PX, and a non-display area DP-NDA adjacent to the display area DP-DA. The non-display area DP-NDA is where no image is displayed.

A pad component in which pads of lines are located is provided in the non-display area DP-NDA. A data driver that provides data signals to the pixels PX is disposed in the non-display area DP-NDA. The data driver transmits data signals to the pixels PX through data lines. The data driver is included in a display driver DDR to be described below.

The display panel DP includes a driving circuit GDC, signal lines SGL, signal pads DP-PD, and pixels PX.

The pixels PX are disposed in the display area DP-DA. Each of the pixels PX includes a light emitting element and a pixel circuit connected to the light emitting element. For example, the light emitting element is one of an organic light emitting diode, or an inorganic light emitting diode such as a micro light emitting diode (a micro LED) or a quantum dot light emitting diode. Furthermore, the light emitting element may be formed of a combination of organic material and inorganic material. In addition, each of the pixels PX may include a single light emitting element, or may include a plurality of light emitting elements. The plurality of light emitting elements of each of the pixels PX may be connected in series, parallel, or series-parallel to each other.

The driving circuit GDC includes a scan driving circuit. The scan driving circuit generates scan signals, and provides scan signals to the scan lines GL. The scan driving circuit also provides other control signals to the pixels PX.

In an embodiment, the scan driving circuit includes a plurality of thin-film transistors formed through the same process as that of the pixel circuit, such as through a low temperature polycrystalline silicon (LTPS) process or a low temperature polycrystalline oxide (LTPO) process.

The signal lines SGL include scan lines GL, data lines DL, a power line PL, and a control signal line CSL. The scan lines GL and the data lines DL are connected to the pixels PX. The power line PL is connected to the pixels PX. The control signal line CSL provides control signals to the scan driving circuit.

The pad component of each of the signal lines SGL is disposed in the non-display area DP-NDA, and overlaps a corresponding signal pad DP-PD. In the non-display area DP-NDA, an area where the signal pads DP-PD are disposed may be defined as a pad area NDA-PD.

The display panel DP further includes dummy pads IS-DPD disposed in the pad area NDA-PD. The dummy pads IS-DPD are formed through a same process as that of the signal lines SGL and are thus disposed on the same layer as the signal lines SGL.

A circuit board PCB is electrically connected to the display panel DP. The circuit board PCB may be a flexible circuit board or a rigid circuit board. The circuit board PCB may be directly coupled to the display panel DP, or may be coupled to the display panel DP by another circuit board.

In an embodiment, the display driver DDR that controls the operation of the display panel DP is disposed on the circuit board PCB. The display driver DDR receives input image data and timing signals, such as a vertical synchronization signal, a horizontal synchronization signal, and clock signals, from an external device, such as a host system such as an application processor. The display driver DDR generates a gate driving control signal that controls the driving circuit GDC based on the timing signals, and transmits the gate driving control signal to the driving circuit GDC.

Furthermore, the display driver DDR generates a data driving control signal that controls the data driver and transmits the data driving control signal to the data driver, and rearranges input image data and transmits the input image data to the data driver. In an embodiment, the data driver is separately disposed from the display driver DDR on the display panel DP or the circuit board PCB.

Furthermore, a sensing driver SDR that controls the input sensing unit ISU is disposed on the circuit board PCB. The sensing driver SDR receives a timing signal, such as a vertical synchronization signal, from an external device, such as a host system such as an application processor, and generates a touch driving signal based on the vertical synchronization signal. Furthermore, the sensing driver SDR receives a sensing signal that corresponds to an external input, such as a touch input from a user, and determines or recognizes a location of the external input, such as the touch input, based on the sensing signal.

In an embodiment, each of the display driver DDR and the sensing driver SDR is mounted on the circuit board PCB in the form of an integrated chip. Alternatively, in an embodiment, the display driver DDR and the sensing driver SDR are mounted on the circuit board PCB as a single integrated chip. The circuit board PCB includes circuit board pads PCB-P that are electrically connected to the display panel DP. The circuit board PCB further includes signal lines that connect the circuit board pads PCB-P with the display driver DDR and/or the sensing driver SDR.

Figure 3:
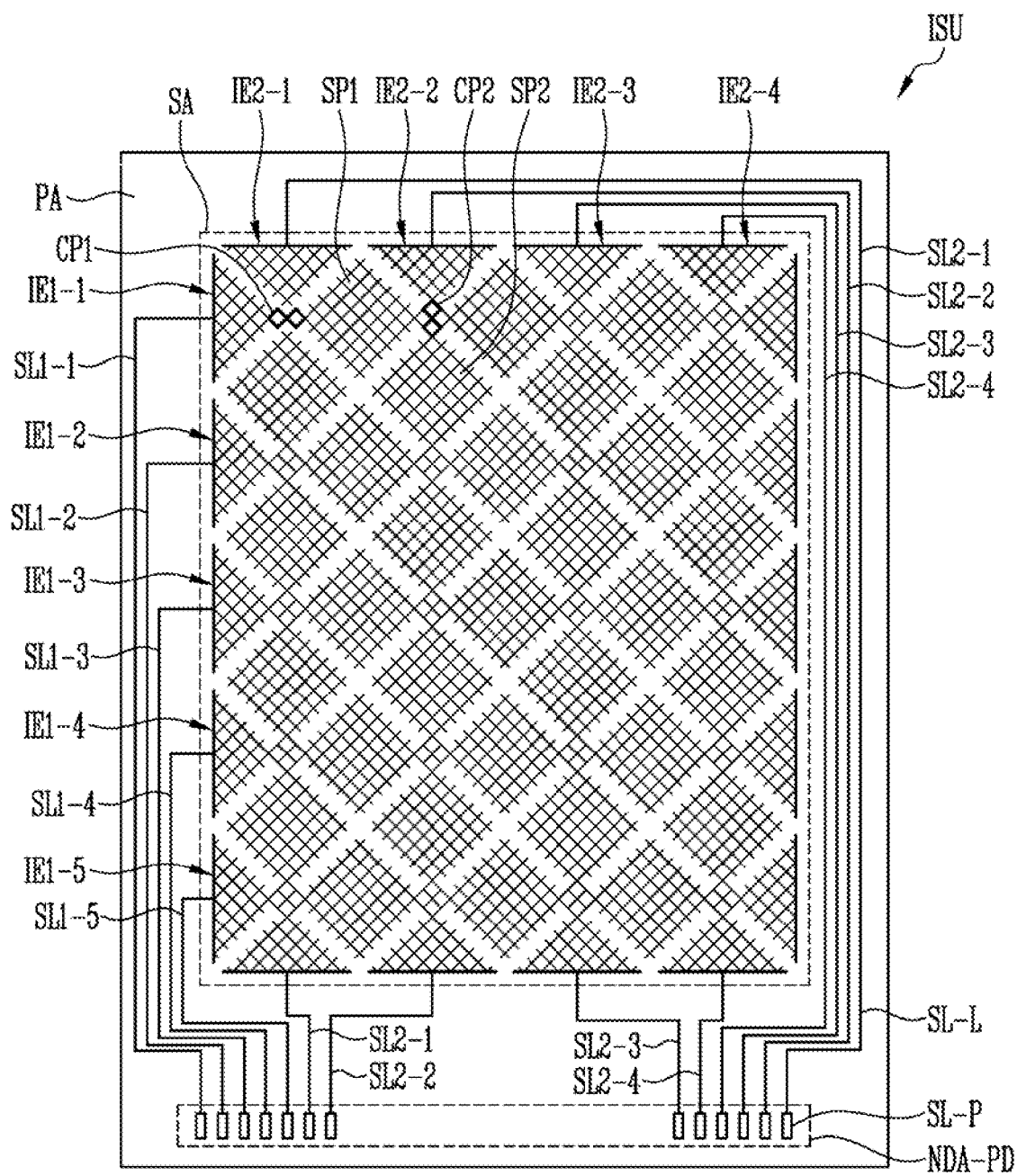
FIG. 3 is a plan view of an input sensing unit in a display device of FIG. 1.

FIG. 3 is a plan view of an input sensing unit ISU in the display device DD of FIG. 1.

Referring to FIGS. 2 and 3, in an embodiment, the input sensing unit ISU includes a sensing area SA that senses an external input, and a peripheral area PA provided on at least one side of the sensing area SA.

The sensing area SA corresponds to the display area DP-DA of the display panel DP and has a surface area substantially identical to or greater than that of the display area DP-DA. The peripheral area PA is adjacent to the sensing area SA.

The input sensing unit ISU include first touch electrodes IE1-1 to IE1-5, such as driving electrodes, disposed in the sensing area SA and that extend in the second direction DR2, and second touch electrodes IE2-1 to IE2-4, such sensing electrodes, disposed in the sensing area SA and that extend in the first direction DR1, and first signal lines SL1-1 to SL1-5 and second signal lines SL2-1 to SL2-4 that are provided in the peripheral area PA.

In each first touch electrode, first sensors SP1 are arranged in the second direction DR2. In each second touch electrode, second sensors SP2 are arranged in the first direction DR1. First connectors CP1 connect adjacent first sensors SP1 to each other. Second connectors CP2 connect adjacent second sensors SP2 to each other.

In an embodiment, the first touch electrodes IE1-1 to IE1-5, hereinafter referred to as "driving electrodes", and the second touch electrodes IE2-1 to IE2-4, hereinafter referred to as "sensing electrodes, form a mesh pattern or a mesh structure. Because the driving electrodes IE1-1 to IE1-5 and the sensing electrodes IE2-1 to IE2-4 form a mesh pattern, a parasitic capacitance with respect to the electrodes DP of the display panel DP is reduced.

When the driving electrodes IE1-1 to IE1-5 and the sensing electrodes IE2-1 to IE2-4 are directly disposed on the display panel DP in a mesh pattern, the flexibility of the display device DD may be enhanced.

Although FIG. 3 illustrates that the first sensors SP1 of the driving electrodes IE1-1 to IE1-5 and the second sensors SP2 of the sensing electrodes IE2-1 to IE2-4 include and each have a rhombus shape, embodiments of the present disclosure are not necessarily limited thereto. For example, the first sensors SP1 and the second sensors SP2 may each have a polygonal shape. For example, each of the driving electrodes IE1-1 to IE1-5 and the sensing electrodes IE2-1 to IE2-4 has a bar shape in which the sensors and the connectors are not distinct from each other.

The first signal lines SL1-1 to SL1-5 are connected to one-side ends of the respective driving electrodes IE1-1 to IE1-5. The second signal lines SL2-1 to SL2-4 are connected to opposite ends of the respective sensing electrodes IE2-1 to IE2-4. However, embodiments of the present disclosure are not necessarily limited thereto, and in some embodiments, the first signal lines SL1-1 to SL1-5 are connected to opposite ends of the respective driving electrodes IE1-1 to IE1-5. Alternatively, in some embodiments, the second signal lines SL2-1 to SL2-4 are connected to only one-side ends of the respective sensing electrodes IE2-1 to IE2-4.

Because the sensing electrodes IE2-1 to IE2-4 are each longer than the driving electrodes IE1-1 to IE1-5, an attenuation rate of a sensing signal, or a detection signal, a transmission signal, etc., of the sensing electrodes IE2-1 to IE2-4 is comparatively increased, so that the sensing sensitivity thereof is reduced. In an embodiment, because the sensing signal is transmitted through the second signal lines SL2-1 to SL2-4 that are connected to the opposite ends of the sensing electrodes IE2-1 to IE2-4, a decrease in the sensing signal or a reduction in the sensing sensitivity can be prevented.

Each of the first signal lines SL1-1 to SL1-5 and each of the second signal lines SL2-1 to SL2-4 includes a line component SL-L and a pad component SL-P. The line component SL-L are connected to the pad component SL-P in the peripheral area PA. The pad components SL-P are disposed in the pad area NDA-PD. For example, the pad components SL-P overlap the dummy pads IS-DPD illustrated in FIG. 2.

Although FIG. 3 illustrates that the input sensing unit ISU includes five driving electrodes IE1-1 to IE1-5 and four sensing electrodes IE2-1 to IE2-4, the number of driving electrodes IE1-1 to IE1-5 and the number of sensing electrodes IE2-1 to IE2-4 are not necessarily limited thereto.

Figure 4:
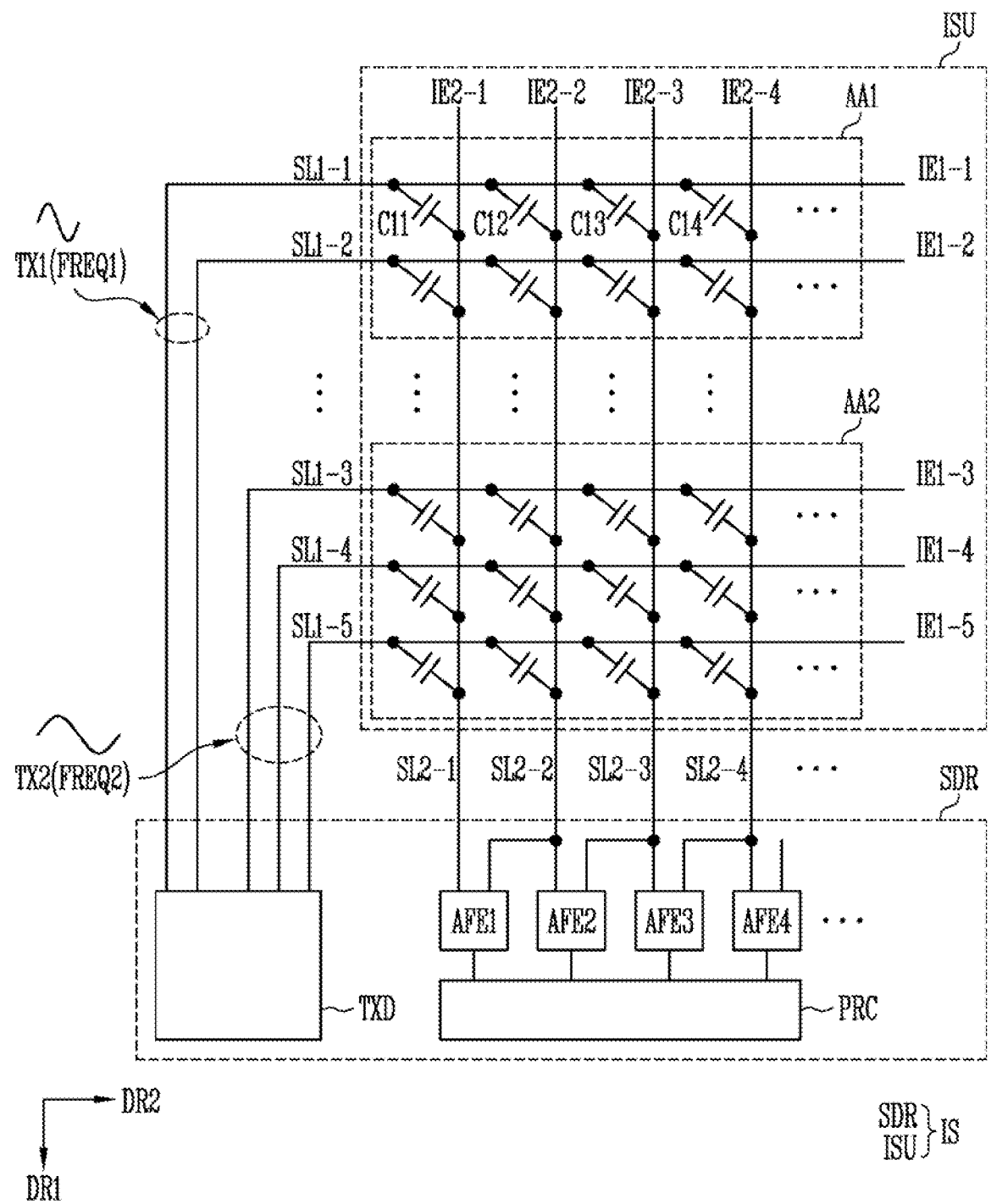
FIG. 4 illustrates an input sensing device in accordance with an embodiment of the present disclosure.
Figure 5:
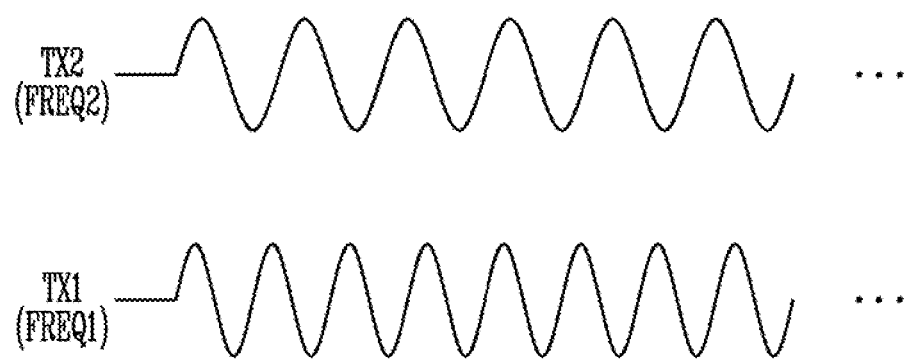
FIG. 5 illustrates driving signals generated by an input sensing device of FIG. 4.

FIG. 4 illustrates an input sensing device IS in accordance with an embodiment of the present disclosure. FIG. 5 illustrates driving signals generated by the input sensing device IS of FIG. 4.

Referring to FIGS. 3, 4, and 5, in an embodiment, the input sensing device IS includes an input sensing unit ISU, and a sensing driver SDR.

The sensing driver SDR includes a driving signal generator TXD, analog front-end circuits AFE1 to AFE4 (or analog front-ends), and a sensing processor PRC.

The driving signal generator TXD generates driving signals TX1 and TX2, and transmits the driving signals TX1 and TX2 to the driving electrodes IE1-1 to IE1-5 through the first signal lines SL1-1 to SL1-5. For example, the first driving signal TX1 are transmitted to the first and second driving electrodes IE1-1 and IE1-2 located in a first area AA1. The second driving signal TX2 are transmitted to the third, fourth, and fifth driving electrodes IE1-3, IE1-4, and IE1-5 located in a second area AA2.

In an embodiment, the first and second driving signals TX1 and TX2 include sine waves. When the first and second driving signals TX1 and TX2 include sine waves, even if a resistance-capacitance delay occurs, the sensing signals that correspond to the driving signals have sine waves similar to those of the driving signals. Hence, noise can be easily removed from the sensing signals.

The driving signal generator TXD supplies the first driving signal TX1 at a first frequency FREQ1, and supplies the second driving signal TX2 at a second frequency FREQ2. In an embodiment, as illustrated in FIG. 5, the first frequency FREQ1 is greater than the second frequency FREQ2. For example, the first frequency FREQ1 is twice the second frequency FREQ2. However, embodiments are not necessarily limited thereto, and in some embodiments, the second frequency FREQ2 is greater than the first frequency FREQ1.

In an embodiment, in a input sensing device IS that includes an input sensing unit ISU that has a large surface area, driving signals are supplied at different frequencies to different areas of the input sensing unit ISU. For example, the driving signal generator TXD simultaneously transmits the first and second driving signals TX1 and TX2 with different frequencies to the corresponding driving electrodes IE1-1 to IE1-5.

The foregoing driving signal application scheme is a multi-frequency sensing scheme. When a touch input is sensed in a multi-frequency sensing scheme, because the driving electrodes IE1-1 to IE1-5 are simultaneously driven using driving signals with different frequencies, a sufficient amount of sensing time can be secured, and a high-speed response operation can be implemented. Therefore, a signal to noise ratio (SNR) of the sensing signals is increased.

In response to the touch driving signals TX1 to TX5 transmitted to the driving electrodes IE1-1 to IE1-5, sensing capacitances form between the driving electrodes IE1-1 to IE1-5 and the sensing electrodes IE2-1 to IE2-4. For example, sensing capacitances C11, C12, C13, and C14 respectively form between the first driving electrode IE1-1 and the sensing electrodes IE2-1 to IE2-4.

Each of the analog front-end circuits AFE1 to AFE4 is connected to two adjacent sensing electrodes or two adjacent second signal lines. Each of the analog front-end circuits AFE1 to AFE4 outputs a sensing value or a differential output value that corresponds to a difference between the corresponding sensing capacitances.

For example, the first analog front-end circuit AFE1 is electrically connected to the first sensing electrode IE2-1 and the second sensing electrode IE2-2, and outputs an analog sensing value that corresponds to a difference between the capacitance C11 of a sensing capacitor formed on the first sensing electrode IE2-1 and the capacitance C12 of a sensing capacitor formed on the second sensing electrode IE2-2.

Likewise, the second analog front-end circuit AFE2 is electrically connected to the second sensing electrode IE2-2 and the third sensing electrode IE2-3, and outputs a sensing value that corresponds to a difference between the capacitance C12 of a sensing capacitor formed on the second sensing electrode IE2-2 and the capacitance C13 of a sensing capacitor formed on the third sensing electrode IE2-3.

In an embodiment, each of the analog front-end circuits AFE1 to AFE4 includes an amplifier, a filter, etc.

In an embodiment, each of the analog front-end circuits AFE1 to AFE4 is implemented as a fully differential analog front-end. For example, the first analog front-end circuit AFE1 differentially amplifies, using a charge amplification component, a first reception signal that corresponds to a sensing capacitance of the first sensing electrode IE2-1, and a second reception signal that corresponds to a sensing capacitance of the second sensing electrode IE2-2, and outputs two differential signals. The first analog front-end circuit AFE1 processes the differential signals and provides the processed differential signals to the sensing processor PRC.

In an embodiment, each of the analog front-end circuits AFE1 to AFE4 separates a sensing signal of the first frequency FREQ1 and a sensing signal of the second frequency FREQ2 that are received from each of the sensing electrodes IE2-1 to IE2-4, and recombines the separated sensing signals. For example, each of the sensing electrodes IE2-1 to IE2-4 transmits a sensing signal of the first frequency FREQ1 and a sensing signal of the second frequency FREQ2 over time. For example, a first frequency FREQ1 sensing signal is supplied from the first sensing electrode IE2-1 during a first period, and a second frequency FREQ2 sensing signal is supplied from the first sensing electrode IE2-1 during a second period.

In an embodiment, each of the analog front-end circuits AFE1 to AFE4 includes a filter component that separates sensing signals that have different frequencies from each other, and a buffer component that recombines the sensing signals and outputs a recombined sensing signal. The recombined signal includes a first frequency component that corresponds to the first frequency FREQ1, and a second frequency component that corresponds to the second frequency FREQ2. Hence, in a multi-frequency sensing scheme, noise frequencies other than the frequencies of the driving signals can be effectively removed so that the SNR of the sensing signals is increased.

Each of the analog front-end circuits AFE1 to AFE4 generates digital sensing data based on the recombined signal. For example, each of the analog front-end circuits AFE1 to AFE4 includes an analog-to-digital converter that converts an analog signal to digital sensing data.

The sensing processor PRC transforms the sensing data into transformed data through a Fourier transform, and determines whether a touch is present and/or a touch location based on the transformed data. For example, the sensing processor PRC includes a Fourier transform component for the Fourier transform. Therefore, the sensing data is transformed into the transformed data that includes a first frequency component and a second frequency component. The sensing processor PRC determines whether a touch is present and/or a touch location, based on a variation between a signal magnitude of the frequencies extracted from the transformed data and a signal magnitude of the driving signals.

Figure 6:
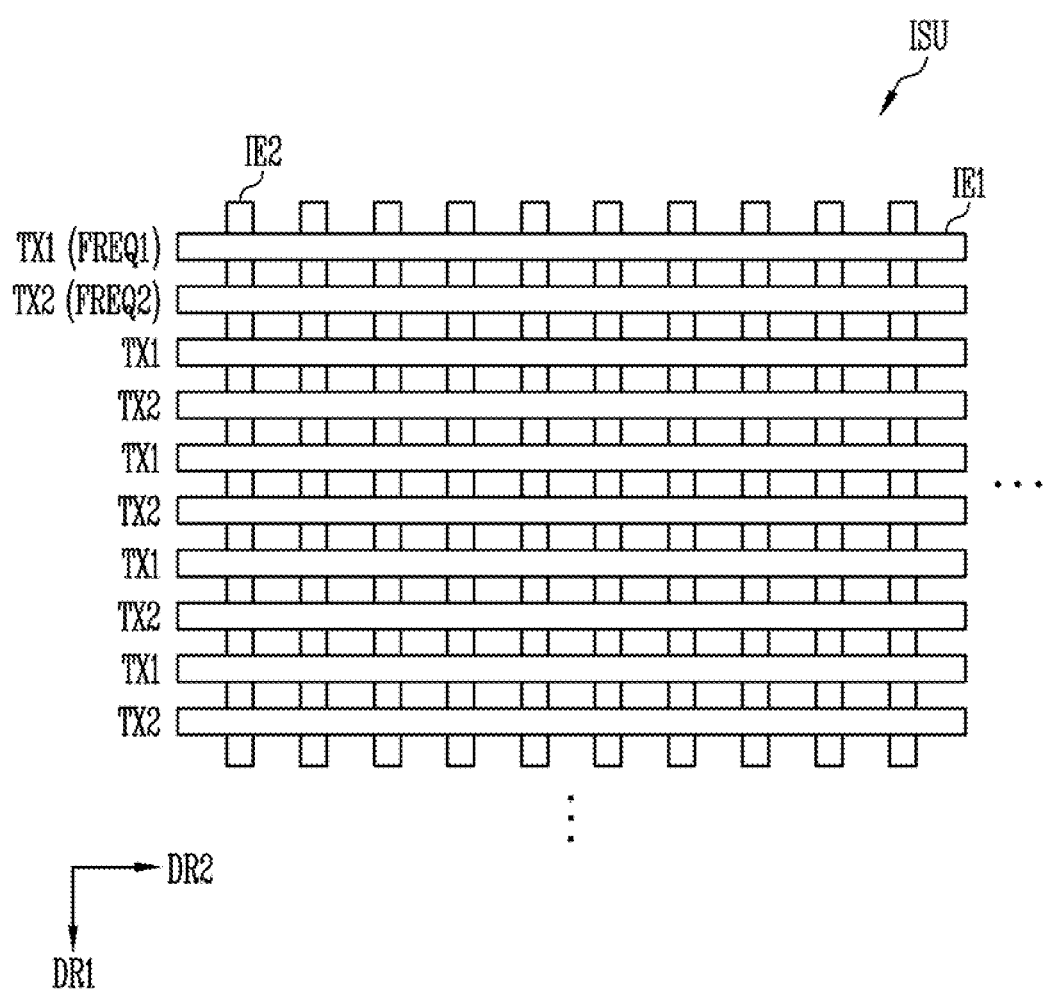
FIG. 6 illustrates driving signals supplied to an input sensing unit in the input sensing device of FIG. 4.
Figure 7:
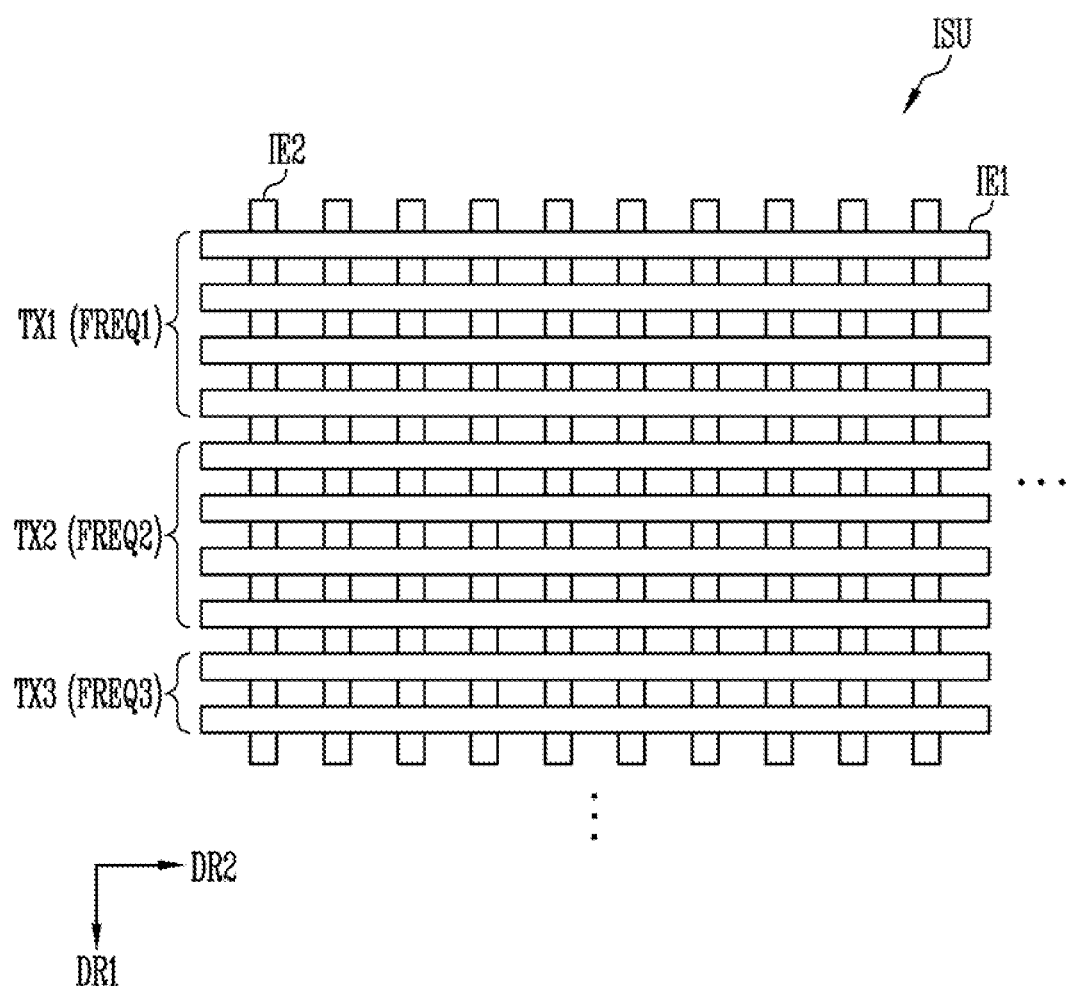
FIG. 7 illustrates another example of driving signals supplied to an input sensing unit in the input sensing device of FIG. 4.

FIG. 6 illustrates driving signals supplied to the input sensing unit ISU in an input sensing device of FIG. 4. FIG. 7 illustrates another example of driving signals supplied to the input sensing unit ISU included in an input sensing device of FIG. 4

Referring to FIGS. 4, 5, 6, and 7, in an embodiment, the input sensing unit ISU includes driving electrodes IE1 and sensing electrodes IE2.

The driving electrodes IE1 and the sensing electrodes IE2 intersect each other, and sensing capacitances form therebetween. For example, the driving electrodes IE1 are arranged in the first direction DR1, and the sensing electrodes IE2 are arranged in the second direction DR2.

In an embodiment, as illustrated in FIG. 6, the first frequency FREQ1 first driving signal TX1 is supplied to odd-numbered driving electrodes, and the second frequency FREQ2 second driving signal TX2 is supplied to even-numbered driving electrodes. However, embodiments are not necessarily limited thereto, and in some embodiments, the first frequency FREQ1 first driving signal TX1 is supplied to the even-numbered driving electrodes, and the second frequency FREQ2 second driving signal TX2 is supplied to the odd-numbered driving electrodes. However, the foregoing is illustrative, and the driving electrodes IE1 to which the first driving signal TX1 and the second driving signal TX2 are to be respectively supplied are not necessarily limited thereto. For example, in some embodiments, the number of driving electrodes IE1 to which the first driving signal TX1 is to be supplied differs from the number of driving electrodes IE2 to which the second driving signal TX2 is to be supplied.

In an embodiment, as illustrated in FIG. 7, the first frequency FREQ1 first driving signal TX is supplied to some of the driving electrodes IE1, the second frequency FREQ2 second driving signal TX2 is supplied to some other driving electrodes IE1, and a third frequency FREQ3 third driving signal TX3 is supplied to still other driving electrodes IE1.

As such, the driving signals TX1, TX2, and TX3 of three or more frequencies are simultaneously supplied to different driving electrodes IE1. Therefore, a sufficient sensing time for the touch input is secured.

Figure 8:
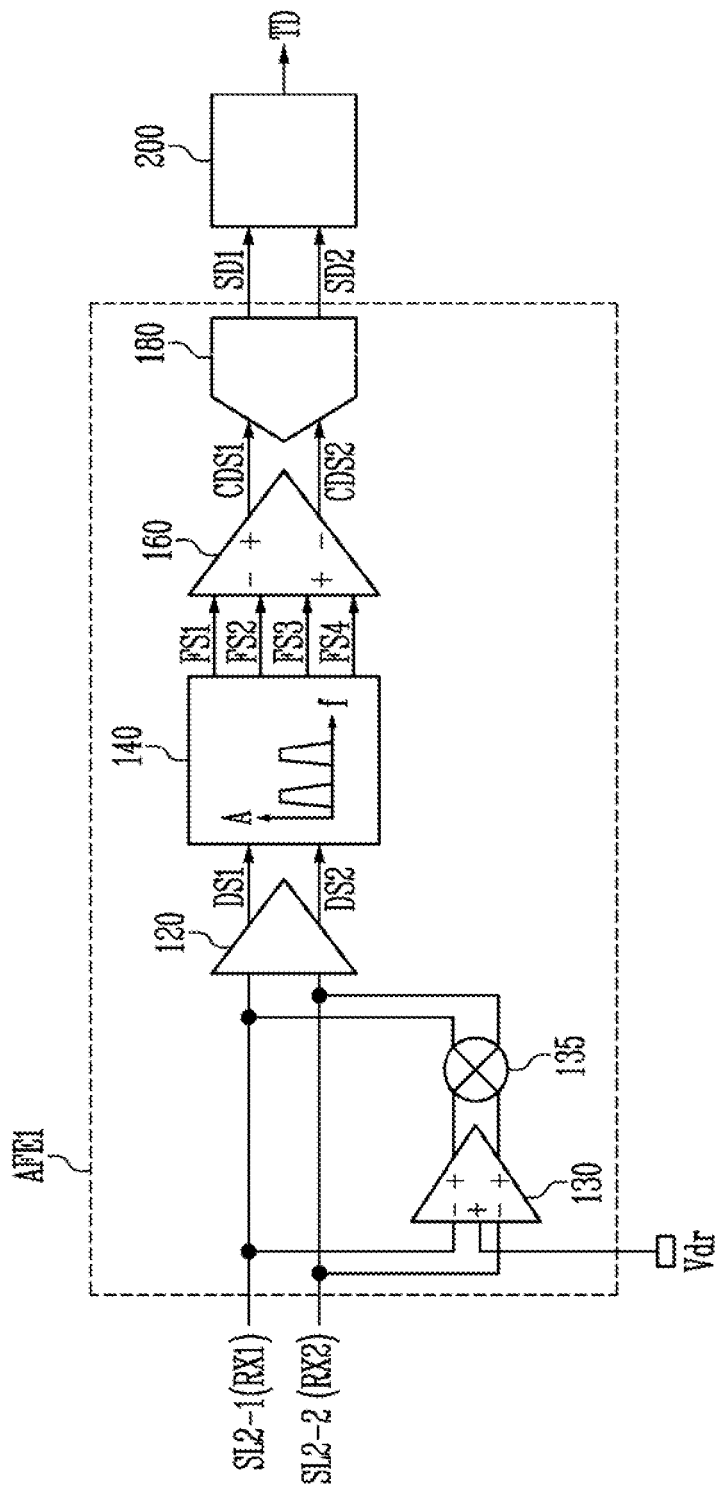
FIG. 8 is a block diagram of an analog front-end circuit in an input sensing device of FIG. 4.

FIG. 8 is a block diagram of the analog front-end circuit included in the input sensing device IS of FIG. 4.

Referring to FIGS. 4 and 8, in an embodiment, the first analog front-end circuit AFE1, hereinafter referred to as the analog front-end circuit, includes a charge amplification component 120, a filter component 140, a buffer component 160, and an analog-to-digital converter 180. The analog front-end circuit AFE1 further includes a common mode feedback circuit 130.

The analog front-end circuit AFE1 receives a first sensing signal RX1 and a second sensing signal RX2 from the second signal lines SL2-1 and SL2-2, respectively. The first sensing signal RX1 includes a first frequency component that corresponds to the first frequency FREQ1, and a second frequency component that corresponds to the second frequency FREQ2. Likewise, the second sensing signal RX2 includes a first frequency component that corresponds to the first frequency FREQ1, and a second frequency component that corresponds to the second frequency FREQ2.

The charge amplification component 120 differentially amplifies the first sensing signal RX1 and the second sensing signal RX2 and outputs a first differential signal DS1 and a second differential signal DS2. In an embodiment, the charge amplification component 120 is a fully differential amplifier. A general differential amplifier differentially amplifies two input signals and outputs a single signal. The fully differential amplifier differentially amplifies two input signals and outputs two differential signals, such as complementary signals.

The fully differential amplifier charge amplification component 120 maximizes the magnitude of sensing signals, with regard to an analog-to-digital converter ADC, such as a differential analog-to-digital converter that differentially amplifies two analog signals and outputs a digital value.

The common mode feedback circuit 130 maintains a common mode of the charge amplification component 120 constant, thus reducing interference of the sensing signals. In an embodiment, the common mode feedback circuit 130 includes a negative feedback loop that maintains a common mode output for the first sensing signal RX1 and the second sensing signal RX2. For example, the common mode feedback circuit 130 includes various known types of amplifier circuits that each including a plurality of transistors, and operates in response to a driving voltage Vdr that drives the amplifier circuits.

Input terminals of the common mode feedback circuit 130 are respectively connected to the 1st second signal line SL2-1 and the 2nd second signal line SL2-2. Furthermore, for negative feedback, output terminals of the common mode feedback circuit 130 each form a negative feedback loop for the corresponding input terminal.

In an embodiment, the analog front-end circuit AFE1 further includes a mixer 135 connected to the output terminals of the common mode feedback circuit 130. The mixer 135 converts the frequency of an input signal. The mixer 135 converts the frequency of an output of the common mode feedback circuit 130 into a form that maintains the common mode. For example, the mixer 135 outputs a signal whose frequency is based on a difference between a frequency of an output of an external local oscillator and a frequency of an output of the common mode feedback circuit 130. In other words, the mixer 135 functions as a switch that outputs a signal at a set frequency.

The output of the common mode feedback circuit 130 and/or the mixer 135 provides frequency noise of the first and second sensing signals RX1 and RX2 to the charge amplification component 120.

The filter component 140 receives the first differential signal DS1 and the second differential signal DS2 from the charge amplification component 120. The filter component 140 filters the first differential signal DS1 and outputs a first filtered signal FS1 and a second filtered signal FS2. The first filtered signal FS1 and the second filtered signal FS2 have different frequency bands. Furthermore, the filter component 140 filters the second differential signal DS2 and outputs a third filtered signal FS3 and a fourth filtered signal FS4. The third filtered signal FS3 and the fourth filtered signal FS4 have different frequency bands.

The first filtered signal FS1 and the third filtered signal FS3 have waveforms that are inverted with respect to each other, and include signals in a substantially identical frequency band. For example, central frequencies of the first filtered signal FS1 and the third filtered signal FS3 are substantially equal to each other.

Likewise, the second filtered signal FS2 and the fourth filtered signal FS4 have waveforms that are inverted with respect to each other, and include signals of a substantially identical frequency band. For example, central frequencies of the second filtered signal FS2 and the fourth filtered signal FS4 are substantially equal to each other.

For example, the central frequencies of the first and third filtered signals FS1 and FS3 include the first frequency FREQ1, and the central frequencies of the second and fourth filtered signals FS2 and FS4 include the second frequency FREQ2.

For example, the filter component 140 separates the frequencies of the sensing signals RX1 and RX2, and removes noise of other frequencies.

In an embodiment, the filter component 140 includes a plurality of band-pass filters that separate a plurality of frequencies. For example, the first band-pass filter outputs a signal of the first frequency FREQ1, and the second band-pass filter outputs a signal of the second frequency FREQ2.

In an embodiment, each of the band-pass filters includes an N-path filter that allows only signals of a preset frequency band to pass therethrough. The N-path filters are connected in parallel to each other. Each of the N-path filters has a relatively small surface area, and has satisfactory filtering performance.

However, the foregoing is illustrative, and embodiments of the filter component 140 are not necessarily limited thereto. For example, in some embodiments, the filter component 140 includes filter circuits that have various known structures, and includes various combinations of filters or a multi-band pass filter that outputs signals of a frequency band that includes the first frequency FREQ1 and signals of a frequency band that includes the second frequency FREQ2.

The buffer component 160 outputs a first combined differential signal CDS1 and a second combined differential signal CDS2, based on the first to fourth filtered signals FS1 to FS4. The first combined differential signal CDS1 is formed by combining the first filtered signal FS1 and the second filtered signal FS2 of different frequency bands. The second combined differential signal CDS2 is formed by combining the third filtered signal FS3 and the fourth filtered signal FS4 of different frequency bands.

In an embodiment, the buffer component 160 includes a signal combination stage, such as a first stage, and a differential difference amplifier (DDA) stage, such as a second stage.

The signal combination stage combines signals to be applied to input terminals of the DDA stage. For example, the signal combination stage combines the first filtered signal FS1 and the second filtered signal FS2 and generates a first input for the DDA stage. Furthermore, the signal combination stage combines the third filtered signal FS3 and the fourth filtered signal FS4 and generates a second input for the DDA stage.

The DDA stage is a fully differential amplifier. The DDA stage outputs the first combined differential signal CDS1 and the second combined differential signal CDS2 based on the first input and the second input. The DDA stage includes a negative feedback loop and functions as an output buffer. For example, the magnitude of the first input is substantially equal to that of the first combined differential signal CDS1. Furthermore, the magnitude of the second input is substantially equal to that of the second combined differential signal CDS2.

The analog-to-digital converter 180 outputs sensing data SD1 and SD2 that respectively correspond to the first combined differential signal CDS1 and the second combined differential signal CDS2. For example, the analog-to-digital converter 180 digitally converts the first combined differential signal CDS1 and generates the first sensing data SD1, and digitally converts the second combined differential signal CDS2 and generates the second sensing data SD2. The analog-to-digital converter 180 may be implemented as a hardware and/or software circuit that includes various known structures.

However, embodiments are not necessarily limited thereto, and in some embodiments, the analog-to-digital converter 180 generates sensing data that corresponds to a difference between the first combined differential signal CDS1 and the second combined differential signal CDS2.

The first sensing data SD1 and the second sensing data SD2 are provided to the sensing processor PRC. In an embodiment, the first sensing data SD1 and the second sensing data SD2 are provided to a Fourier transform component 200 of the sensing processor PRC. The Fourier transform component 200 Fourier transforms the first sensing data SD1 and the second sensing data SD2 to transformed data TD that includes a first frequency component and a second frequency component. For example, the first frequency component corresponds to the first frequency FREQ1, and the second frequency component corresponds to the second frequency FREQ2.

The sensing processor PRC determines a touch location and/or whether a touch has occurred, based on the transformed data TD. For example, the sensing processor PRC determines a touch location and/or whether a touch has occurred, based on variations between the magnitudes of the frequencies in the transformed data TD and the magnitudes of the frequencies in the driving signals.

Figure 9:
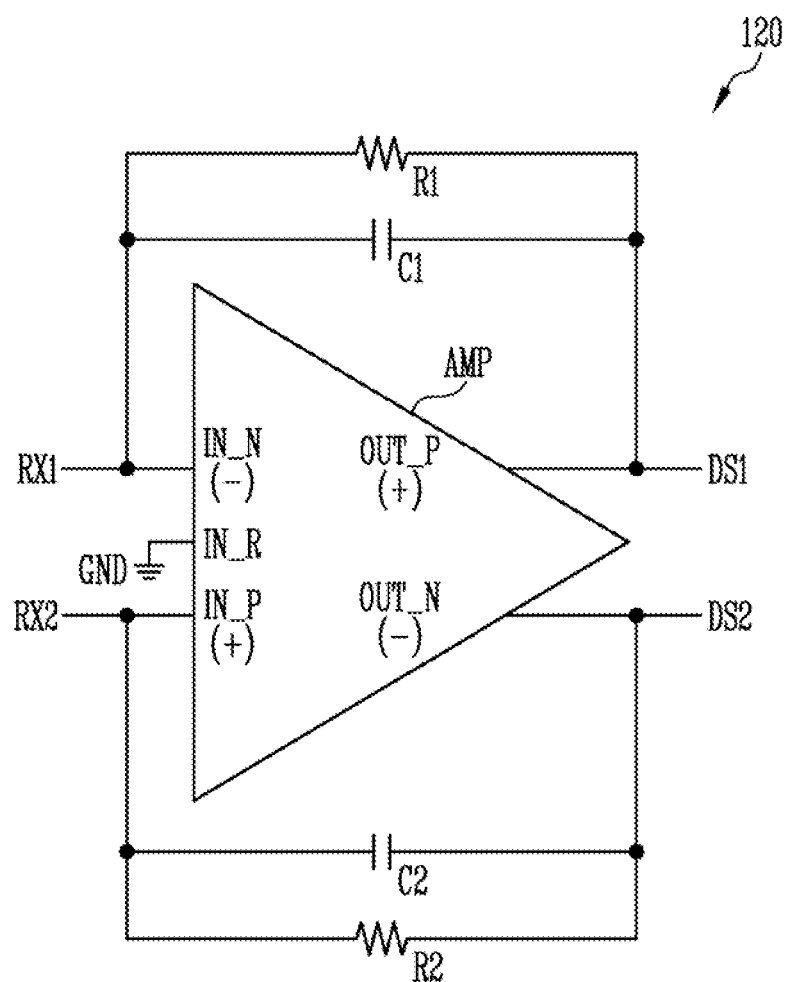
FIG. 9 illustrates a charge amplification component in an analog front-end circuit of FIG. 8.

FIG. 9 illustrates the charge amplification component 120 in an analog front-end circuit of FIG. 8.

Referring to FIGS. 4, 8, and 9, in an embodiment, the charge amplification component 120 includes an amplifier AMP, a first capacitor C1, a first resistor R1, a second capacitor C2, and a second resistor R2.

The amplifier AMP includes a second input terminal IN_P, such as a positive input terminal ("+"), a first input terminal IN_N, such as a negative input terminal ("−"), a first output terminal OUT_P, such as a positive output terminal ("+"), and a second output terminal OUT_N, such as a negative output terminal ("−"). The amplifier AMP further includes a third input terminal IN_R, which is a reference input terminal. A reference voltage GND is applied to the third input terminal IN_R.

The first sensing signal RX1 is applied to the first input terminal IN_N of the amplifier AMP. The second sensing signal RX2 is applied to the second input terminal IN_P of the amplifier AMP.

The first capacitor C1 and the first resistor R1 are connected in parallel between the first input terminal IN_N and the first output terminal OUT_P of the amplifier AMP. Therefore, the first differential signal DS1 that corresponds to a difference between the first sensing signal RX1 and the second sensing signal RX2 is output through the first output terminal OUT_P of the amplifier AMP.

Likewise, the second capacitor C2 and the second resistor R2 are connected in parallel between the second input terminal IN_P and the second output terminal OUT_N of the amplifier AMP. The second resistor R2 (and the first resistor R1) have a fixed resistance value, or are formed of a variable resistor or a switch. Therefore, the second differential signal DS2 that corresponds to a difference between the first sensing signal RX1 and the second sensing signal RX2 is output through the second output terminal OUT_N of the amplifier AMP. The second differential signal DS2 has a waveform that is the inverse of the first differential signal DS1.

Because the charge amplification component 120 outputs the first differential signal DS1 and the second differential signal DS2 in a differential scheme, AC offset and common noise may be removed.

However, the configuration of the charge amplification component 120 of FIG. 9 is illustrative and not necessarily limited thereto, and in an embodiment, the amplifier AMP includes sub-amplifiers.

Figure 10:
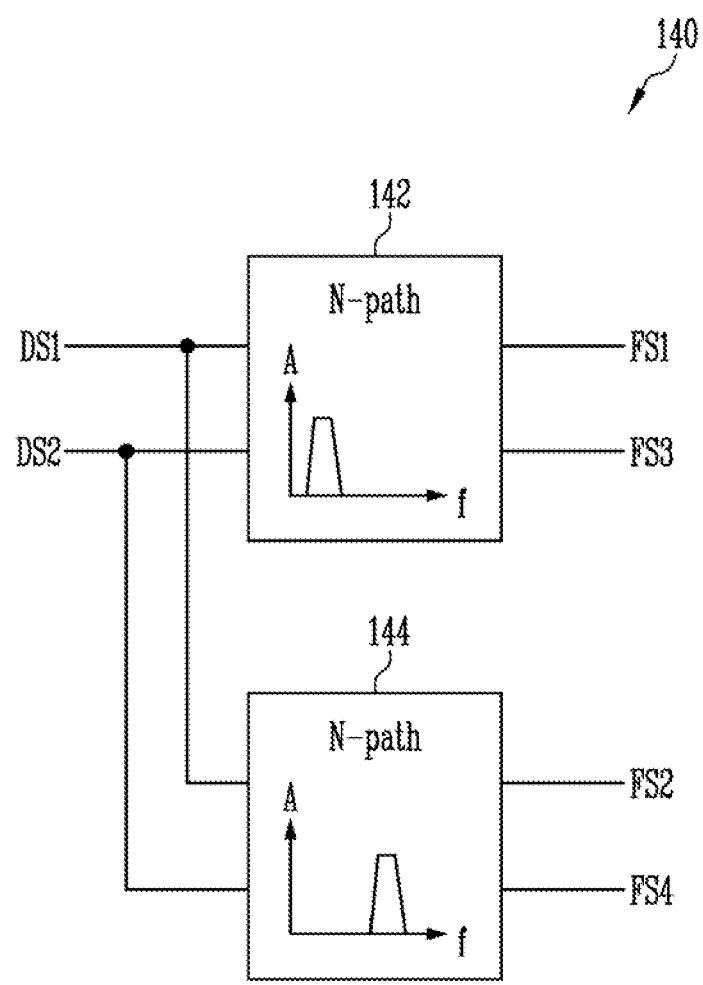
FIG. 10 illustrates a filter component in an analog front-end circuit of FIG. 8.
Figure 11:
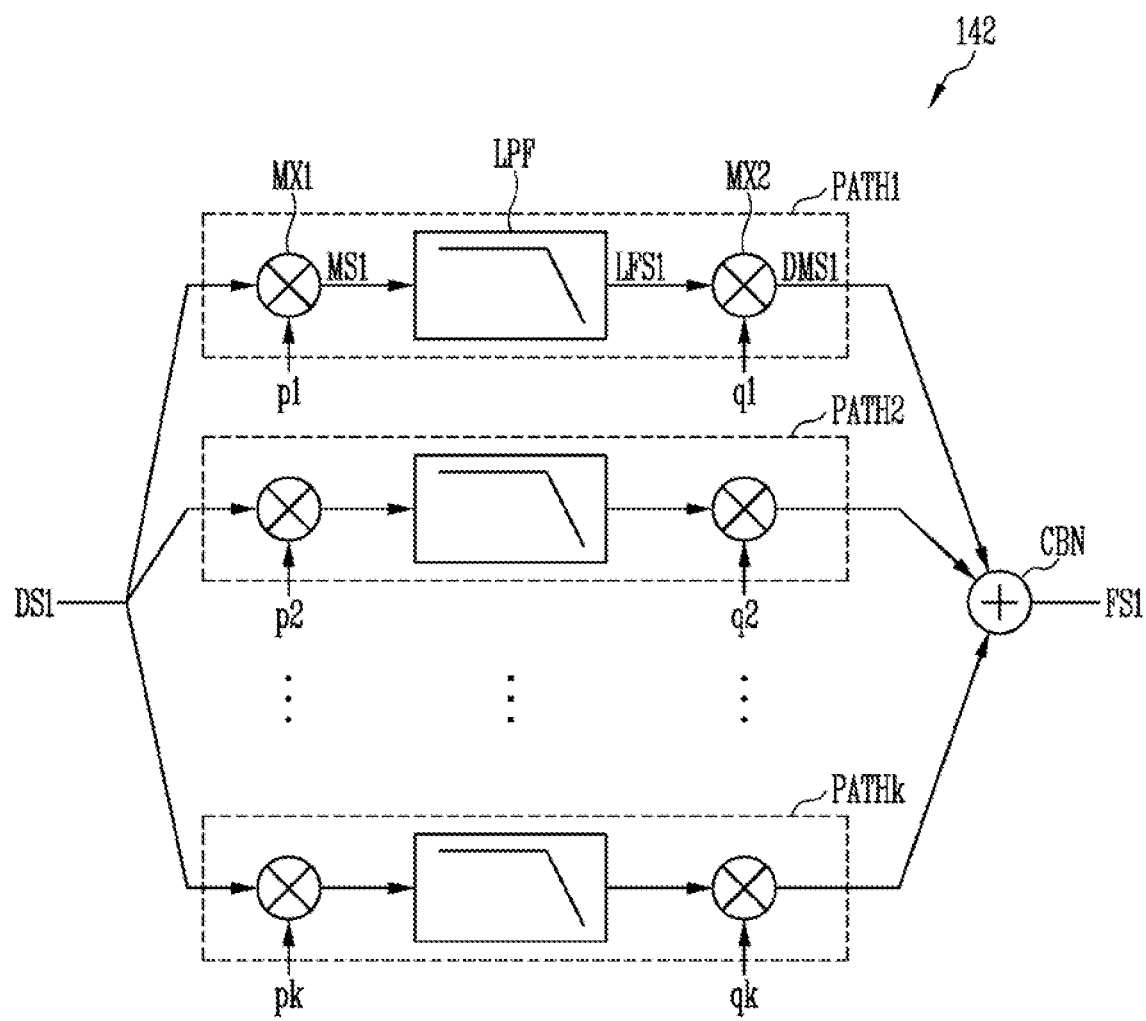
FIG. 11 illustrates a first N-path filter in a filter component of FIG. 10.

FIG. 10 illustrates the filter component 140 in the analog front-end circuit of FIG. 8. FIG. 11 illustrates a first N-path filter in the filter component 140 of FIG. 10.

Referring to FIGS. 4, 8, 10, and 11, in an embodiment, the filter component 140 includes a first N-path filter 142 and a second N-path filter 144.

The first differential signal DS1 and the second differential signal DS2 are provided to the first and second N-path filters 142 and 144.

The first N-path filter 142 is a band-pass filter that allows a signal of a frequency band that includes the first frequency FREQ1 to pass therethrough. The first N-path filter 142 filters the first differential signal DS1 and outputs the first filtered signal FS1 in a frequency band that includes the first frequency FREQ1, and filters the second differential signal DS2 and outputs the third filtered signal FS3 in a frequency band that includes the first frequency FREQ1. In other words, the first N-path filter 142 removes noise of other frequency bands so that only sensing signals that correspond to the first frequency FREQ1 can be extracted.

The second N-path filter 144 is a band-pass filter that allows a signal of a frequency band that includes the second frequency FREQ2 to pass therethrough. The second N-path filter 144 filters the first differential signal DS1 and outputs a second filtered signal FS2 in a frequency band that includes the second frequency FREQ2, and filters the second differential signal DS2 and outputs a fourth filtered signal FS4 in a frequency band that includes the second frequency FREQ2.

For example, the second N-path filter 144 removes noise of other frequency bands so that only sensing signals that correspond to the second frequency FREQ2 can be extracted.

The first N-path filter 142 and the second N-path filter 144 are connected in parallel between the charge amplification component 120 and the buffer component 160. For example, the first N-path filter 142 and the second N-path filter 144 are connected in parallel between output terminals of the charge amplification component 120 and input terminals of the buffer component 160. Signals that are separated in frequency by the first N-path filter 142 and the second N-path filter 144 are each provided to the buffer component 160.

In an embodiment, each of the first and second N-path filters 142 and 144 includes a first mixer MX1, a low-pass filter LPF, and a second mixer MX2. FIG. 11 illustrates a portion of the first N-path filter 142. For example, FIG. 11 illustrates a configuration in which the first N-path filter 142 outputs the first filtered signal FS1 using the first differential signal DS1. A configuration in which the first N-path filter 142 outputs the third filtered signal FS3 using the second differential signal DS2, and the configurations of the second N-path filter 144 are substantially identical or similar to those of FIG. 11; therefore, an example of the filter component 140 will be described based on configurations of the first N-path filter 142 of FIG. 11.

The first mixer MX1, the low-pass filter LPF, and the second mixer MX2 form a single signal path. For example, the first N-path filter 142 includes k signal paths PATH1, PATH2, . . . , PATHk, where k is an integer greater than 1. The number of signal paths PATH1, PATH2, . . . , PATHk determines the degree of the N-path filter. Unnecessary harmonic components are removed and/or reduced through a signal combination that uses a plurality of signal paths PATH1, PATH2, . . . , PATHk.

The following description will be based on the first mixer MX1, the low-pass filter LPF, and the second mixer MX2 in the first signal path PATH1. The configurations of the signal paths PATH1, PATH2, . . . , PATHk are substantially the same, other than clock signals provided to the mixers MX1 and MX2.

The first mixer MX1 down-converts the frequency of an input signal, such as the first differential signal DS1, and outputs a modulated signal MS1. The first mixer MX1 includes a switch, such as a MOSFET switch, etc., that is implemented by a clock signal p1. The clock signals p1, p2, . . . , pk are respectively supplied to the signal paths PATH1, PATH2, . . . , PATHk at different timings, based on the frequency of the input signal. For example, the clock signals p1, p2, . . . , pk successively have a phase difference of 360°/k.

The low-pass filter LPF outputs a low frequency band signal LFS1 of the modulated signal MS1. The low-pass filter LPF includes a simple circuit structure that includes a resistor and a capacitor.

The second mixer MX2 up-converts the low frequency band signal LFS1 to an original frequency band and outputs a demodulated signal DMS1. The central frequency of the modulated signal DMS1 of the first N-path filter 142 corresponds to the first frequency FREQ1. The second mixer MX2 includes a switch, such as a MOSFET switch, etc., that is implemented by a clock signal q1. The clock signals q1, q2, . . . , qk are respectively supplied to the signal paths PATH1, PATH2, . . . , PATHk at different timings, based on the frequency of the input signal. For example, the clock signals q1, q2, . . . , qk successively have a phase difference of 360°/k.

In an embodiment, the first N-path filter 142 further includes a combiner CBN. The combiner CBN combines outputs from the signal paths PATH1, PATH2, . . . , PATHk and outputs the first filtered signal FS1.

Likewise, the first N-path filter 142 processes the second differential signal DS2 and outputs the third filtered signal FS3. A configuration that outputs the third filtered signal FS3 is substantially the same as the structure of FIG. 11.

For example, the first N-path filter 142 outputs the first filtered signal FS1 and the third filtered signal FS3 that are in a frequency band that includes the first frequency FREQ1 as a central frequency.

As described above, the second N-path filter 144 has a structure similar to that of the first N-path filter 142. The second N-path filter 144 receives first and second differential signals DS1 and DS2, and outputs the second filtered signal FS2 and the fourth filtered signal FS4 in a frequency band that includes the second frequency FREQ2 as a central frequency. Outputs of the N-path filters 142 and 144 are fully differential signals.

For example, the N-path filters 142 and 144 respectively function as band-pass filters that separately output a signal of the first frequency FREQ1 and a signal of the second frequency FREQ2. Furthermore, the N-path filters 142 and 144 effectively remove noise signals with low power consumption.

In an embodiment, the filter component 140 includes a multi-band pass filter that substitutes for the N-path filters 142 and 144. The multi-band pass filter can be implemented as a combination of various known frequency filter circuits, etc. For example, in an embodiment, the multi-band pass filter includes two output terminals and outputs two differential signals that correspond to a plurality of frequency bands. Therefore, in an embodiment of the filter component 140, the signal combination described with reference to FIG. 11 is omitted.

Figure 12:
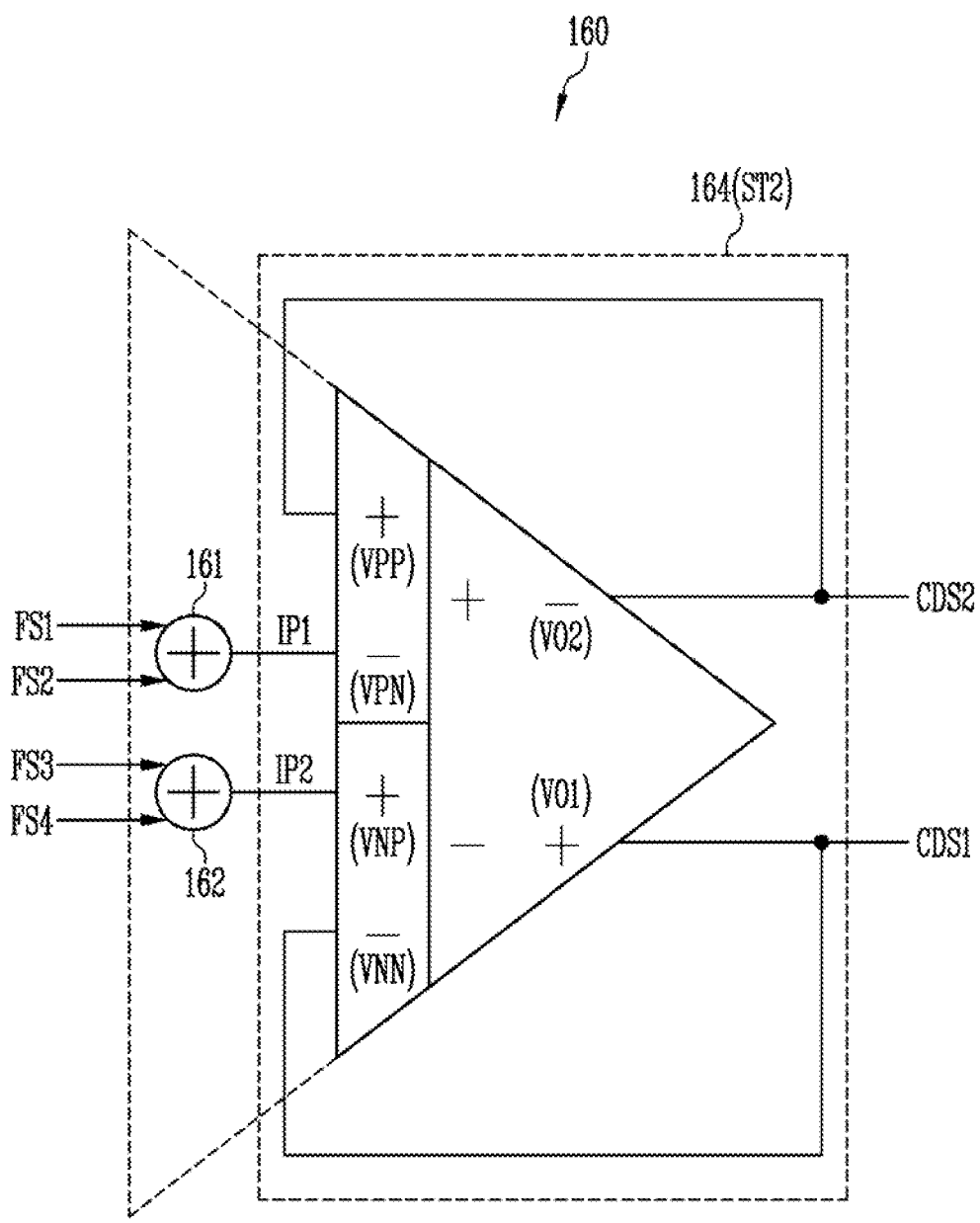
FIG. 12 illustrates a buffer component in an analog front-end circuit of FIG. 8.
Figure 13:
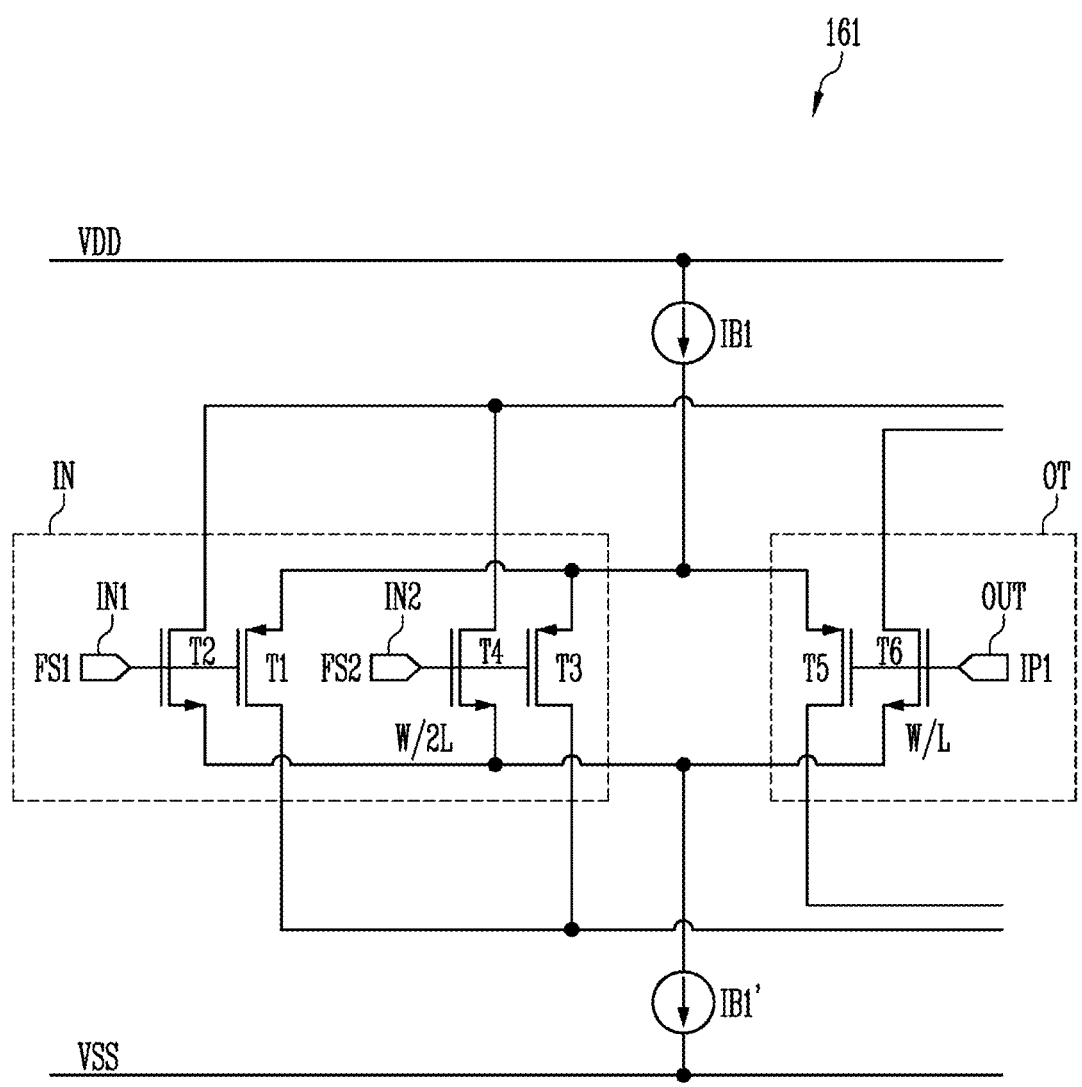
FIG. 13 illustrates a portion of a first stage in a buffer component of FIG. 12.

FIG. 12 illustrates the buffer component 160 in the analog front-end circuit of FIG. 8. FIG. 13 illustrates a portion of a first stage in the buffer component 160 of FIG. 12.

Referring to FIGS. 4, 8, 10, 12, and 13, in an embodiment, the buffer component 160 includes first stage ST1 and a second stage ST2.

The first stage ST1 combines the first filtered signal FS1 and the second filtered signal FS2 and generates a first input IP1, and combines the third filtered signal FS3 and the fourth filtered signal FS4 and generates a second input IP2. In an embodiment, the first stage ST1 includes a first combiner 161 that combines the first filtered signal FS1 and the second filtered signal FS2, and a second combiner 162 that combines the third filtered signal FS3 and the fourth filtered signal FS4.

The first combiner 161 includes a signal combination circuit that includes MOSFET switches. In an embodiment, as illustrated in FIG. 13, the first combiner 161 includes a combination of NMOS transistors and PMOS transistors that are connected in parallel to current sources IB1 and IB1'. The first current source IB1 is connected to a first power supply VDD. The second current source IB1' is connected to a second power supply VSS.

For example, the first combiner 161 includes an input circuit IN and an output circuit OT. The input circuit IN includes first and third transistors T1 and T3 connected in parallel to the first current source IB1, and second and fourth transistors T2 and T4 connected in parallel to the second current source IB1'.

The first input terminal IN1 is connected to gate electrodes of the first and second transistors T1 and T2. The first filtered signal FS1 is provided to the first input terminal IN1.

The second input terminal IN2 is connected to gate electrodes of the third and fourth transistors T3 and T4. The second filtered signal FS2 is provided to the second input terminal IN2.

The output circuit OT includes a fifth transistor T5 connected to the first current source IB1, and a sixth transistor T6 connected to the second current source IB1'. The output terminal OUT is connected to gate electrodes of the fifth and sixth transistors T5 and T6. The first input IP1 formed by combining the first filtered signal FS1 and the second filtered signal FS2 is output from the output terminal OUT.

In an embodiment, a surface area W/2L (or a channel width W/2) of each of the first to fourth transistors T1 to T4 is approximately ½ of a surface area W/L (or a channel width W) of each of the fifth and sixth transistors T5 and T6. Hence, the first filtered signal FS1 and the second filtered signal FS2 are combined and output without a large increase in signal magnitudes. The first input IP1 includes a first frequency component and a second frequency component.

The second combiner 162 has substantially the same structure as the first combiner 161. Furthermore, the first input IP1 and the second input IP2 are fully differential signals.

Although FIG. 12 illustrates that the first stage ST1 and the second stage ST2 have different configurations, embodiments are not necessarily limited thereto, and in some embodiments, the buffer component 160, which includes the first and second stages ST1 and ST2, is implemented as a single amplifier. For example, the first stage ST1 is an input terminal of a differential difference amplifier 164 and the second stage ST2 is an output terminal of the differential difference amplifier 164.

The second stage ST2 outputs the first combined differential signal CDS1 and the second combined differential signal CDS2, based on the first input IP1 and the second input IP2. The second stage ST2 includes the differential difference amplifier 164 and has a negative feedback loop. The differential difference amplifier 164 is a fully differential amplifier.

The differential difference amplifier 164 includes a first input terminal VPP, a second input terminal VPN, a third input terminal VNP, a fourth input terminal VNN, a first output terminal VO1, and a second output terminal VO2. The differential difference amplifier 164 is supplied with two pairs of differential inputs. The first input terminal VPP and the third input terminal VNP are positive input terminals. The second input terminal VPN and the fourth input terminal VNN are negative input terminals. The first output terminal VO1 is a positive output terminal. The second output terminal VO2 is a negative output terminal.

The first input IP1 is applied to the second input terminal VPN. For example, the output terminal OUT of FIG. 13 is the same as the second input terminal VPN of the differential difference amplifier 164, or is electrically connected to the second input terminal VPN. Likewise, the second input IP2 is applied to the third input terminal VNP.

The first combined differential signal CDS1 is output from the first output terminal VO1. The second combined differential signal CDS2 is output from the second output terminal VO2. The first combined differential signal CDS1 and the second combined differential signal CDS2 are fully differential signals.

In an embodiment, the second output terminal VO2 and the first input terminal VPP form a negative feedback loop. The first output terminal VO1 and the fourth input terminal VNN form a negative feedback loop. Hence, the differential difference amplifier 164 functions as a fully differential buffer that has a gain of 1. For example, a voltage difference between the first input IP1 and the second input IP2 is substantially the same as a voltage difference between the first combined differential signal CDS1 and the second combined differential signal CDS2. The first combined differential signal CDS1 and the second combined differential signal CDS2 are provided to the analog-to-digital converter 180.

The differential difference amplifier 164 receives two independent inputs, so that the influence of noise can be reduced. The differential difference amplifier 164 is implemented as a MOSFET amplifier, which has various known structures. For example, the differential difference amplifier 164 has a folded cascade structure.

The buffer component 160 recombines differential signals that are separated from each other by frequency by the filter component 140, and uses the differential difference amplifier 164 as a fully differential buffer. Therefore, multi-frequency sensing signals are obtained that are effectively noise-free.

Figure 14:
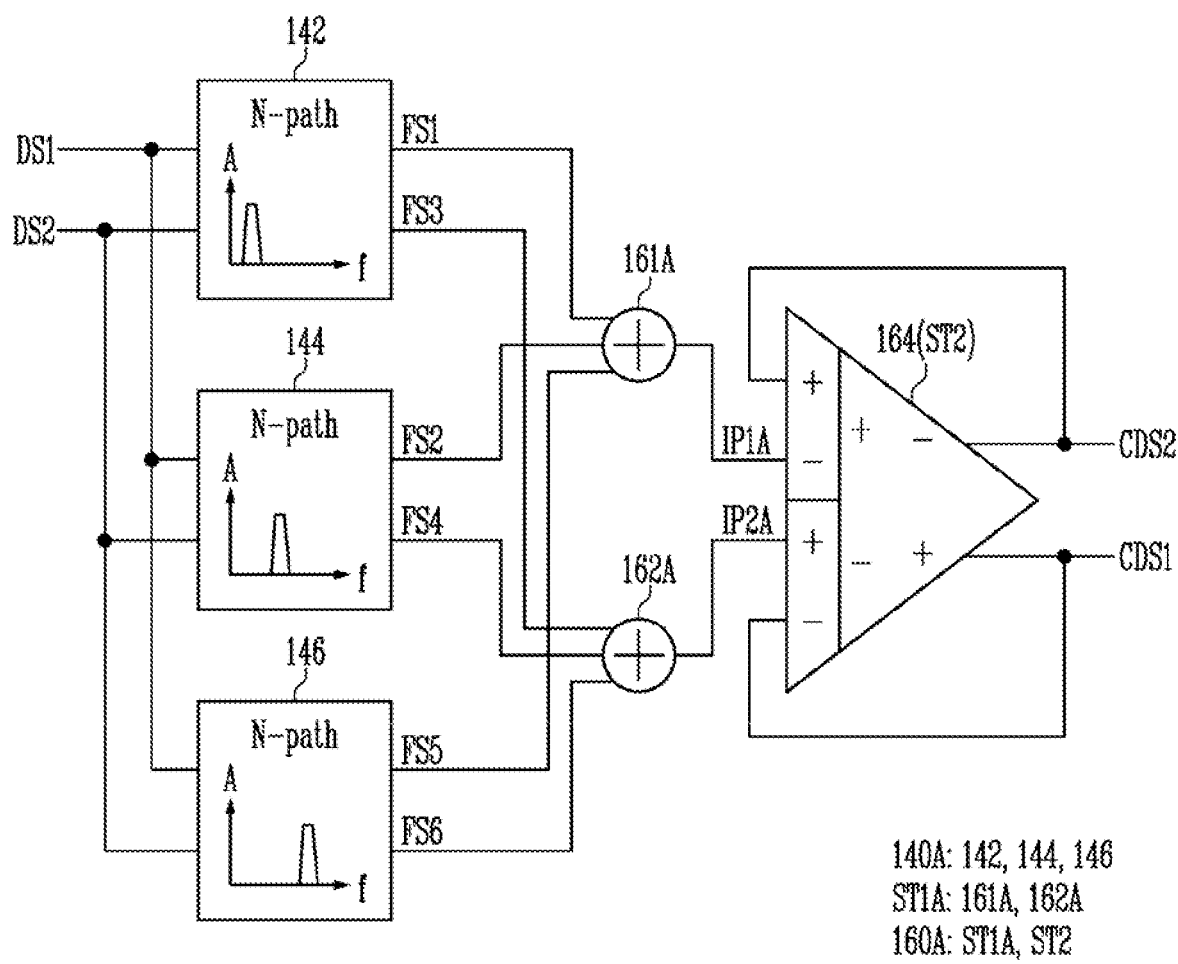
FIG. 14 illustrates a filter component and a buffer component in an analog front-end circuit of FIG. 8.

FIG. 14 illustrates the filter component 140 and the buffer component 160 in the analog front-end circuit of FIG. 8, according to an embodiment of the disclosure.

In FIG. 14, like reference numerals may be used to designate the same components as those described with reference to FIGS. 10 to 12, and repetitive explanation of those components may be omitted.

Referring to FIGS. 4, 8, and 14, in an embodiment, a filter component 140A includes a first N-path filter 142, a second N-path filter 144, and a third N-path filter 146. A buffer component 160A includes a first stage ST1A and a second stage ST2.

As described with reference to FIG. 7, in an embodiment, driving signals are simultaneously supplied to the input sensing unit ISU at three or more frequencies. For example, the first to third driving signals TX1, TX2, and TX3 are respectively supplied at first to third frequencies FREQ1, FREQ2, and FREQ3. For example, as illustrated in FIG. 14, the three N-path filters 142, 144, and 146 are connected in parallel to each other.

The first, second, and third N-path filters 142, 144, and 146 each receives the first differential signal DS1 and the second differential signal DS2.

The first N-path filter 142 is a band-pass filter that allows a signal of a frequency band that includes the first frequency FREQ1 to pass therethrough. The second N-path filter 144 is a band-pass filter that allows a signal of a frequency band that includes the second frequency FREQ2 to pass therethrough.

The third N-path filter 146 is a band-pass filter that allows a signal of a frequency band that includes the third frequency FREQ3 to pass therethrough. The third N-path filter 146 outputs a fifth filtered signal FS5 and a sixth filtered signal FS6.

The first, second, and third N-path filters 142, 144, and 146 are connected in parallel to each other. The filter component 140A outputs filtered signals FS1 to FS6 that are divided into three frequency regions, in response to the frequencies of the driving signals.

The first stage ST1A of the buffer component 160A includes a first combiner 161A and a second combiner 162A.

The first combiner 161A combines the first filtered signal FS1, the second filtered signal FS2, and the fifth filtered signal FS5 and generates a first input IP1A. The first input IP1A is formed by mixing the first, second, and third frequencies FREQ1, FREQ2, and FREQ3.

The second combiner 162A combines the third filtered signal FS3, the fourth filtered signal FS4, and the sixth filtered signal FS6 and generates a second input IP2A. The second input IP2A is formed by mixing the first, second, and third frequencies FREQ1, FREQ2, and FREQ3.

The first combiner 161A and the second combiner 162A are similar to the MOSFET circuit described with reference to FIG. 13. For example, the input circuit of the first combiner 161A further includes a connection structure and an additional input terminal that are similar to those of the first and second transistors T1 and T2. Furthermore, a surface area ratio of each of the transistors of the input circuit and each of the transistors of the output circuit differs from that of FIG. 13.

The differential difference amplifier 164 of the second stage ST2 of the buffer component 160A functions as a buffer, and outputs a first combined differential signal CDS1 and a second combined differential signal CDS2 that have a voltage difference substantially identical to a voltage difference between the first input IP1A and the second input IP2A.

The SNR of the sensing signals in a multi-frequency sensing scheme that uses three or more frequencies is increased by the filter component 140A and the buffer component 160A.

Figure 15:
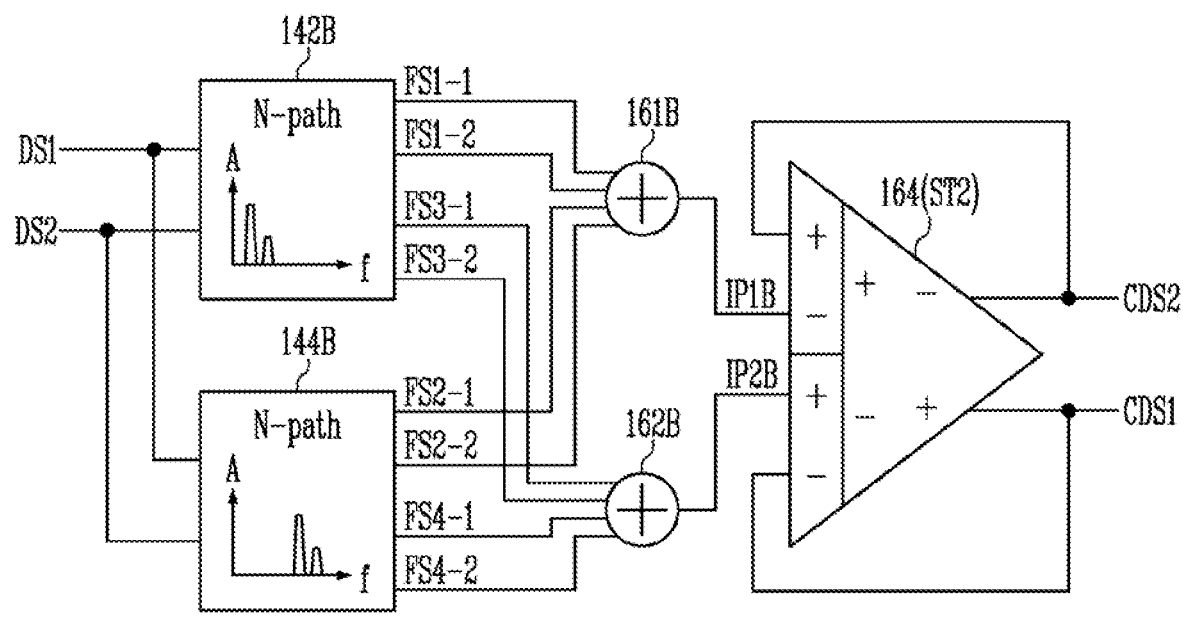
FIG. 15 illustrates a filter component and a buffer component in an analog front-end circuit of FIG. 8.

FIG. 15 illustrates the filter component 140 and the buffer component 160 in the analog front-end circuit of FIG. 8, according to an embodiment of the disclosure.

In FIG. 15, like reference numerals may be used to designate the same components as those described with reference to FIGS. 10 to 12, and repetitive explanation of those components may be omitted.

Referring to FIGS. 4, 8, and 15, in an embodiment, a filter component 140B includes a first N-path filter 142B and a second N-path filter 144B. A buffer component 160B includes a first stage ST1B and a second stage ST2.

Each of the first N-path filter 142B and the second N-path filter 144B includes fourth outputs. First filtered signals FS1-1 and FS1-2 and respective third filtered signals FS3-1 and FS3-2 that are output from the first N-path filter 142B have a differential relationship. Furthermore, central frequencies of the first filtered signals FS1-1 and FS1-2 differ from each other, and central frequencies of the third filtered signals FS3-1 and FS3-2 differ from each other.

Second filtered signals FS2-1 and FS2-2 and respective fourth filtered signals FS4-1 and FS4-2 that are output from the second N-path filter 144B have a differential relationship. Furthermore, central frequencies of the second filtered signals FS2-1 and FS2-2 differ from each other, and central frequencies of the fourth filtered signals FS4-1 and FS4-2 differ from each other.

The foregoing output structures of the first N-path filter 142B and the second N-path filter 144B remove a third harmonic component. Therefore, the frequency filtering performance of the filter component 140B is increased.

The first stage ST1B of the buffer component 160B includes a first combiner 161B and a second combiner 162B.

The first combiner 161B combines the first filtered signals FS1-1 and FS1-2 and the second filtered signals FS2-1 and FS2-2 and generates a first input IP1B. The second combiner 162B combines the third filtered signals FS3-1 and FS3-2 and the fourth filtered signals FS4-1 and FS4-2 and generates a second input IP2B.

The differential difference amplifier 164 of the second stage ST2 of the buffer component 160B functions as a buffer, and outputs a first combined differential signal CDS1 and a second combined differential signal CDS2 that have a voltage difference that is substantially identical to a voltage difference between the first input IP1B and the second input IP2B.

Figure 16:
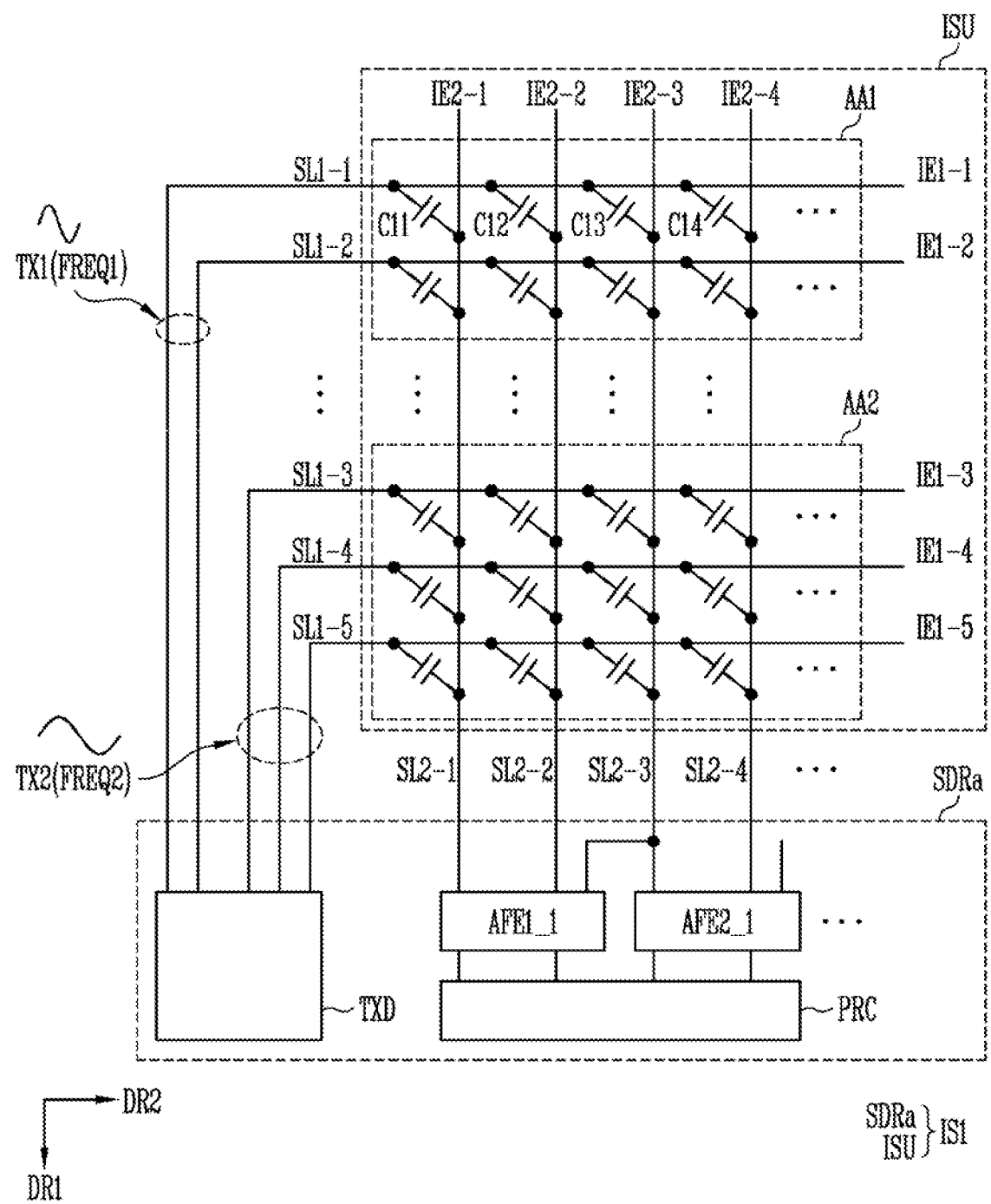
FIG. 16 illustrates an input sensing device of FIG. 4.

FIG. 16 the input sensing device IS of FIG. 4, according to an embodiment of the disclosure.

In FIG. 16, like reference numerals may designate the same components as those described with reference to FIG. 4, and repetitive explanation of the components may be omitted.

Referring to FIGS. 4 and 16, in an embodiment, an input sensing device IS1 includes an input sensing unit ISU, and a sensing driver SDRa.

The sensing driver SDRa includes a driving signal generator TXD, analog front-end circuits AFE1_1 and AFE2_1, and a sensing processor PRC.

Each of the analog front-end circuits AFE1_1 and AFE2_1 is connected to three of the sensing electrodes IE2-1 to IE2-4 (or second signal lines), and selects two sensing electrodes from the three sensing electrodes.

For example, the first analog front-end circuit AFE1_1 is connected to the first sensing electrode IE2-1, the second sensing electrode IE2-2, and the third sensing electrode IE2-3. The first analog front-end circuit AFE1_1 selects the first sensing electrode IE2-1 and the second sensing electrode IE2-2 during a first period, and selects the second sensing electrode IE2-2 and the third sensing electrode IE2-3 during a second period.

Figure 17:
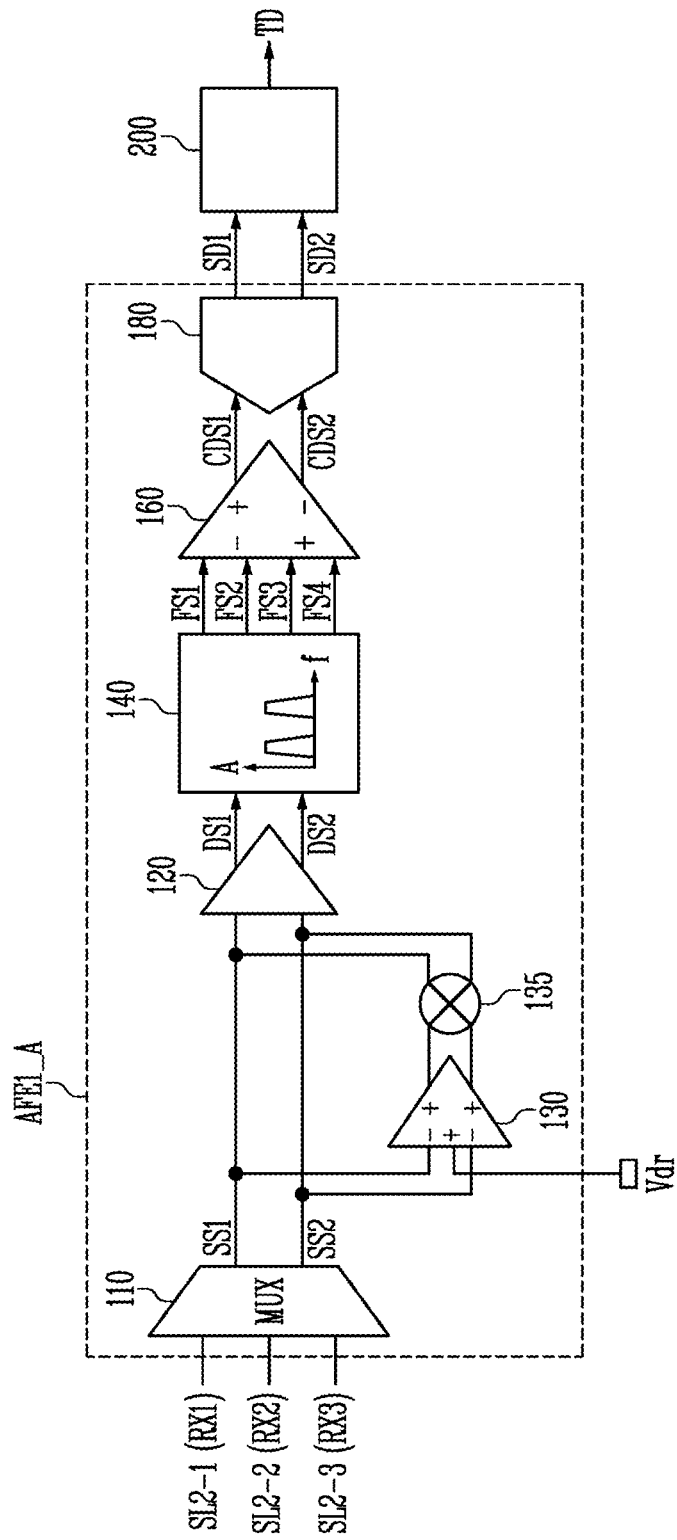
FIG. 17 illustrates an analog front-end circuit in the input sensing device of FIG. 16.

FIG. 17 is a block diagram of the analog front-end circuit in the input sensing device IS1 of FIG. 16.

A configuration of an analog front-end circuit AFE1_A of FIG. 17, except for a distribution circuit 110 (or a multiplexer), is identical or similar to that of the analog front-end circuit AFE1 of FIG. 8. In FIG. 17, like reference numerals may be used to designate the same components as those described with reference to FIG. 8, and repetitive explanation of those components may be omitted.

Referring to FIGS. 16 and 17, in an embodiment, the analog front-end circuit AFE1_A includes a distribution circuit 110, an amplification component 120, a common mode feedback circuit 130, a mixer 135, a filter component 140, a buffer component 160, and an analog-to-digital converter 180.

In an embodiment, the distribution circuit 110 includes a multiplexer. The multiplexer is a circuit that may have one of various known structures.

The distribution circuit 110 (or the multiplexer) selects two of the sensing electrodes IE2-1 to IE2-4 and connects the two selected sensing electrodes to the first and second input terminals of the charge amplification component 120. In an embodiment, the distribution circuit 110 is connected to a 1st second signal line SL2-1, a 2nd second signal line SL2-2, and a 3rd second signal line SL2-3. The 1st second signal line SL2-1, the 2nd second signal line SL2-2, and the 3rd second signal line SL2-3 respectively transmit a first sensing signal RX1, a second sensing signal RX2, and a third sensing signal RX3.

The distribution circuit 110 selects two of the first sensing signal RX1, the second sensing signal RX2, and the third sensing signal RX3. The selected signals are respectively provided to the charge amplification component 120 and the common mode feedback circuit 130 as a first input signal SS1 and a second input signal SS2.

Because the distribution circuit 110 is added, the number of analog front-end circuits AFE1_1 and AFE2_1 in the sensing driver SDRa is reduced. Therefore, the surface area of a receiver side of the sensing driver SDRa is reduced.

As described above, in a multi-frequency sensing type input sensing device and a display device that includes the input sensing device in accordance with embodiments of the present disclosure, an analog front-end circuit includes N-path filters connected in parallel in correspondence to the number of frequencies of driving signals, so that noise can be effectively removed, and a sufficient amount of sensing time can be secured, whereby the SNR of sensing signals is increased. Furthermore, the analog front-end circuit further includes a buffer component that recombines frequencies separated from each other by the N-path filters and functions as a buffer, so that the reliability of sensing data is increased. Therefore, the sensing accuracy and precision of the input sensing device is increased.

However, effects of embodiments of the present disclosure are not limited to the above-described effects, and various modifications are possible without departing from the spirit and scope of embodiments of the present disclosure.

While embodiments of the present disclosure have been described above, those skilled in the art will appreciate that various modifications, additions and substitutions are possible, without departing from the scope and spirit of embodiments of the present disclosure as claimed in the appended claims.

What is claimed is:

1. An analog front-end circuit, comprising:
   a charge amplification component that includes a first input terminal that receives a first sensing signal, a second input terminal that receives a second sensing signal, a first output terminal, and a second output terminal, wherein the charge amplification component differentially amplifies the first sensing signal and the second sensing signal, and outputs a differentially amplified first differential signal to the first output terminal, and a differentially amplified second differential signal to the second output terminal;
   a filter component that includes a first band-pass filter and a second band-pass filter, wherein the first band-pass filter is connected to the first output terminal and the second output terminal and the second band-pass filter is connected to the first output terminal and the second output terminal; and
   a buffer component connected to the first band-pass filter and the second band-pass filter;
   wherein the first band-pass filter and the second band-pass filter are connected in parallel between the charge amplification component and the buffer component.

2. The analog front-end circuit according to claim 1, wherein the first band-pass filter filters the first differential signal and outputs a first filtered signal, and filters the second differential signal and outputs a third filtered signal, and
   wherein the second band-pass filter filters the first differential signal and outputs a second filtered signal, and filters the second differential signal and outputs a fourth filtered signal.

3. The analog front-end circuit according to claim 2, wherein the first band-pass filter passes a signal in a frequency band that includes a first frequency, and
   wherein the second band-pass filter passes a signal in a frequency band that includes a second frequency.

4. The analog front-end circuit according to claim 3, wherein the frequency band that includes the first frequency and the frequency band that includes the second frequency are different from each other.

5. The analog front-end circuit according to claim 2,
wherein each of the first filtered signal and the third filtered signal is a signal in a frequency band that includes a first frequency, and
wherein each of the second filtered signal and the fourth filtered signal is a signal in a frequency band that includes a second frequency.

6. The analog front-end circuit according to claim 5,
wherein the first filtered signal and the third filtered signal have waveforms that are inverted with respect to each other, and
wherein the second filtered signal and the fourth filtered signal have waveforms that are inverted with respect to each other.

7. The analog front-end circuit according to claim 5,
wherein central frequencies of the first filtered signal and the third filtered signal are the same as the first frequency, and
wherein central frequencies of the second filtered signal and the fourth filtered signal are the same as the second frequency.

8. The analog front-end circuit according to claim 2, wherein at least one of the first band-pass filter or the second band-pass filter comprises:
a first mixer that outputs a modulated signal obtained by down-converting a frequency of the first differential signal;
a low-pass filter that outputs a low frequency band signal of the modulated signal; and
a second mixer that outputs a demodulated signal obtained by up-converting the low frequency band signal of the modulated signal.

9. The analog front-end circuit according to claim 8,
wherein the at least one of the first band-pass filter or the second band-pass filter includes a plurality of signal paths,
wherein each of the plurality of signal paths includes the first mixer, the low-pass filter, and the second mixer,
wherein the at least one of the first band-pass filter or the second band-pass filter further comprises:
a combiner that combines the demodulated signal received from the second mixer of each of the plurality of signal paths.

10. The analog front-end circuit according to claim 2, wherein the buffer component outputs a first combined differential signal and a second combined differential signal based on the first to fourth filtered signals.

11. The analog front-end circuit according to claim 2, wherein the buffer component comprises:
a first stage that generates a first input by combining the first filtered signal and the second filtered signal, and generates a second input by combining the third filtered signal and the fourth filtered signal; and
a second stage that outputs a first combined differential signal and a second combined differential signal based on the first input and the second input.

12. The analog front-end circuit according to claim 11, wherein the first stage comprises:
a first combiner that includes transistors that combine the first filtered signal and the second filtered signal; and
a second combiner that includes transistors that combine the third filtered signal and the fourth filtered signal.

13. The analog front-end circuit according to claim 11, wherein the second stage comprises:
a differential difference amplifier (DDA) that receives the first input and the second input and includes a negative feedback loop.

14. The analog front-end circuit according to claim 13, wherein the DDA comprises:
a first input terminal;
a second input terminal to which the first input is applied;
a third input terminal to which the second input is applied;
a fourth input terminal;
a first output terminal wherein the first output terminal and the first input terminal form the negative feedback loop;
a second output terminal wherein the second output terminal and the fourth input terminal form the negative feedback loop.

15. The analog front-end circuit according to claim 14, wherein a gain of the DDA is 1.

16. The analog front-end circuit according to claim 1, wherein a waveform of the second differential signal is the same as a waveform obtained by inverting the first differential signal.

17. A method of driving an analog front-end circuit, comprising:
receiving, by a charge amplification component, a first sensing signal through a first input terminal and receiving a second sensing signal through a second input terminal;
outputting, by the charge amplification component, a first differential signal obtained by differentially amplifying the first sensing signal and the second sensing signal;
outputting, by the charge amplification component, a second differential signal obtained by differentially amplifying the first sensing signal and the second sensing signal;
receiving, by a first band-pass filter, the first differential signal and the second differential signal;
outputting, by the first band-pass filter, a first filtered signal obtained by filtering the first differential signal and a third filtered signal obtained by filtering the second differential signal;
receiving, by a second band-pass filter, the first differential signal and the second differential signal;
outputting, by the second band-pass filter, a second filtered signal obtained by filtering the first differential signal and a fourth filtered signal obtained by filtering the second differential signal; and
receiving, by a buffer component, the first to fourth filtered signals,
wherein the first band-pass filter and the second band-pass filter are connected in parallel between the charge amplification component and the buffer component.

18. The method according to claim 17, wherein each of the first filtered signal and the third filtered signal is in a frequency band that includes a first frequency, and
wherein each of the second filtered signal and the fourth filtered signal is a frequency band that includes a second frequency.

19. The method according to claim 18,
wherein the first filtered signal and the third filtered signal have waveforms that are inverted with respect to each other, and
wherein the second filtered signal and the fourth filtered signal have waveforms that are inverted with respect to each other.

20. The method according to claim 17, wherein outputting, by the first band-pass filter, the first filtered signal obtained by filtering the first differential signal and the third filtered signal obtained by filtering the second differential signal comprises:

outputting a modulated signal obtained by down-converting a frequency of the first differential signal;

outputting a low frequency band signal of the modulated signal; and outputting a demodulated signal obtained by up-converting the low frequency band signal of the modulated signal.

21. The method according to claim 20, wherein outputting, by the first band-pass filter, the first filtered signal obtained by filtering the first differential signal and the third filtered signal obtained by filtering the second differential signal further comprises:

outputting the first filtered signal by combining a plurality of demodulated signals.

22. The method according to claim 17, wherein the method further comprises:

generating a first input by combining the first filtered signal and the second filtered signal;

generating a second input by combining the third filtered signal and the fourth filtered signal;

outputting a first combined differential signal based on the first input and the second input; and outputting a second combined differential signal based on the first input and the second input.

23. The method according to claim 22, wherein outputting the first combined differential signal based on the first input and the second input comprises:

forming a negative feedback loop through a first input terminal and a first output terminal;

applying the first input to a second input terminal;

applying the second input to a third input terminal; and forming a negative feedback loop through a fourth input terminal and a second output terminal.

24. The method according to claim 17, wherein a waveform of the second differential signal is the same as a waveform obtained by inverting the first differential signal.

* * * * *